(12) United States Patent
Black et al.

(10) Patent No.: US 10,380,538 B2
(45) Date of Patent: Aug. 13, 2019

(54) DISCOVERY OF ELECTRONIC ASSETS USING FINGERPRINTS

(75) Inventors: Alistair D'Lougar Black, Los Gatos, CA (US); John Robert Thorpe, Sunnyvale, CA (US)

(73) Assignee: BDNA Corporation, Itasca, IL (US)

( * ) Notice: Subject to any disclaimer, the term of this patent is extended or adjusted under 35 U.S.C. 154(b) by 891 days.

(21) Appl. No.: 11/236,139

(22) Filed: Sep. 27, 2005

(65) Prior Publication Data

US 2007/0198609 A1    Aug. 23, 2007

(51) Int. Cl.
*G06F 15/173* (2006.01)
*G06Q 10/08* (2012.01)
*G06F 11/14* (2006.01)

(52) U.S. Cl.
CPC ........ *G06Q 10/087* (2013.01); *G06F 11/1464* (2013.01)

(58) Field of Classification Search
USPC .......................................................... 709/224
See application file for complete search history.

(56) References Cited

U.S. PATENT DOCUMENTS

| | | | | |
|---|---|---|---|---|
| 5,276,860 | A * | 1/1994 | Fortier et al. | 714/6 |
| 6,014,697 | A * | 1/2000 | Lewis et al. | 709/223 |
| 2003/0200294 | A1 * | 10/2003 | Thorpe et al. | 709/223 |
| 2004/0117414 | A1 * | 6/2004 | Braun et al. | 707/204 |
| 2004/0122645 | A1 * | 6/2004 | Shevenell et al. | 703/21 |
| 2004/0133689 | A1 * | 7/2004 | Vasisht | 709/228 |
| 2006/0129415 | A1 * | 6/2006 | Thukral et al. | 705/1 |
| 2006/0136903 | A1 * | 6/2006 | Childress et al. | 717/172 |
| 2006/0161462 | A1 * | 7/2006 | Sharma | 705/4 |
| 2007/0033163 | A1 * | 2/2007 | Epstein | G06F 17/30017 |

OTHER PUBLICATIONS

Yuri Breitbart, Minos Garofalakis, Ben Jai, Cliff Martin, Rajeev Rastogi, and Avi Silberschatz, "topology Discovery in Heterogeneous IP networks: The NetInventory System", Jun. 2004, IEEE/ACM Transactions on Networking, vol. 12, No. 3, all pages.*

* cited by examiner

*Primary Examiner* — Hua Fan
(74) *Attorney, Agent, or Firm* — Knobbe, Martens, Olson & Bear, LLP

(57) ABSTRACT

A system to conduct automatic asset discovery inventory of a company's computing assets from backup images stored on a backup system. In more complex embodiments, user interface tools are provided to provide a choice of sources of data from which to conduct said inventory discovery. The user can choose between backup images, the actual computing systems and other nodes on one more networks of a company or third party software. If third party software is chosen, data gathered by the software about the network topology and attributes of systems on the network is gathered and converted to an intermediate data format. This intermediate data format is then converted to a data format understood by said automatic asset discovery system and then fingerprints stored in said automatic asset discovery system are compared to said data and conclusions drawn about the attributes of the network and systems on it. These conclusions are then stored in a repository along with conclusions drawn from comparison of fingerprints to said backup images and/or said computing systems themselves.

12 Claims, 26 Drawing Sheets

ELEMENT / ATTRIBUTE DEF. & CATALOGUE

| | PARENT OR GRANDPARENT | CHILD OR GRANDCHILD |
|---|---|---|
| 1) | UNIX SERVER | UNIX FILE SYSTEM |
| 2) | UNIX SERVER | UNIX MAINTENANCE AGREEMENT |
| 3) | UNIX FILE SYSTEM | FILE TYPE 1 |
| 4) | UNIX SERVER | FILE TYPE 1 |

CONTAINMENT TABLE

FIG. 10 (Prior Art)

FIG. 11 (Prior Art) — USER DEFINED CORRELATION TABLE

FIG. 12 (Prior Art) — COLLECTED DATA TABLE

CPU COLLECTION
ELEMENT TREE
NAME (ID, TYPEID) [ATTR = VALUE] ←—— 125

```
TYPES (1) ←—— 201
    OS (2) [TYPE, HOSTNAME]
    USER (3) [NAME, PASSWORD]
    SUPERUSER (4,3) [NAME, PASSWORD]
    FILE (5) [NAME, SIZE] ←—— 221
        UNIX (10, 5) [NAME, SIZE, OWNER] ←—— 223
        WINDOWS (11,5) [NAME, SIZE, ARCHIVE]
    MEMORY (6) [SIZE, %USED]
    CPU (7) [CHIPID, TYPE, SPEED, %USED]
    PROCESS (8) [NAME]
    HTTP (9) [PORT, RESPONSE, TYPE, #PROCESSES]
FINGERPRINT (100) ←—— 203
    NETWORK (101) [NETWORK, MASK, BOTTOMIP, TOPIP] ←—— 207
        NIC (102) [ADDRESS, RESPONSE] ←—— 209
            SOLARIS 2.7 (103,2) [TYPE, HOSTNAME] ←—— 211
                HTTP (104,9) [PORT, RESPONSE, TYPE, #PROCESSES] ←—— 213
                SUPERUSER (105,4) [NAME, PASSWORD] ←—— 215
                MEMORY (106,6) [SIZE, %USED] ←—— 217
                CPU (107,7) [CHIPID, TYPE, SPEED, %USED] ←—— 219
            HTTP (108,5) [NAME] ←—— 231
DATA (1000) ←—— 105
    1.1.1.0 (1001,101) [NETWORK = 1.1.1.0, MASK = 255.255.255.0, BOTTOMIP = 1.1.1.2, TOPIP = 1.1.1.254] ←—— 227
        1.1.1.20 (1002,102) [ADDRESS = 1.1.1.20, RESPONSE = 25MS] ←—— 229
            SOLARIS 2.7 (1003,103) [TYPE = SOLARIS 2.7, HOSTNAME = SUN01] ←—— 231
                HTTP (1004,104) [PORT = 80, RESPONSE = <HTML>, TYPE = APACHE 1.3, #PROCESSES = 10] ←—— 233
                SUPERUSER (1005,105) [NAME = ROOT, PASSWORD = #######] ←—— 235
                MEMORY (1006,106) [SIZE = 512, %USED = 55] ←—— 237
                CPU (1007,107) [CHIPID = SPARC01,SPARC02,TYPE = SPARC, SPARC, SPEED = 880,950, %USED = 75, 45]
```

ELEMENT DATA TABLE

FIG. 14 (Prior Art)

| ELEMENTS | | | | |
|---|---|---|---|---|
| ID | NAME | TYPEID | COLLECTORID | REFRESH |
| 0 | ROOT | | | |
| 1 | TYPES | | | |
| 2 | OS | | | |
| 3 | USER | | | |
| 4 | SUPERUSER | 3 | | |
| 5 | FILE | | | |
| 6 | MEMORY | | | |
| 7 | CPU | | | |
| 8 | PROCESS | | | |
| 9 | HTTP | | | |
| 10 | UNIX | 5 | 206 | |
| 11 | WINDOWS | 5 | 207 | |
| 100 | FINGERPRINT | | | |
| 101 | NETWORK | | | |
| 102 | NIC | | | |
| 103 | SOLARIS 2.7 | 2 | | |
| 104 | HTTP | 9 | | |
| 105 | SUPERUSER | 4 | | |
| 106 | MEMORY | 6 | 216 | |
| 107 | CPU | 7 | 217 | |
| 108 | HTTPD | 8 | | |
| 1000 | DATA | | | |
| 1001 | 1.1.1.0 | 101 | | |
| 1002 | 1.1.1.20 | 102 | | |
| 1003 | SOLARIS 2.7 | 103 | | |
| 1004 | HTTP | 104 | | |
| 1005 | SUPERUSER | 105 | | |
| 1006 | MEMORY | 106 | | |
| 1007 | CPU | 107 | | |

FIG. 15 (Prior Art)

| ATTRIBUTES | | | |
|---|---|---|---|
| ID | NAME | COLNAME | DATATYPE |
| 49 | TYPE | A1 | STRING |
| 50 | HOSTNAME | A2 | STRING |
| 51 | NAME | A1 | STRING |
| 52 | PASSWORD | A2 | ENCRYPTED |
| 53 | NAME | A1 | STRING |
| 54 | SIZE | A2 | NUMBER |
| 55 | SIZE | A1 | NUMBER |
| 56 | %USED | A2 | NUMBER |
| 57 | CHIPID | A1 | STRING |
| 58 | TYPE | A2 | STRING |
| 59 | SPEED | A3 | NUMBER |
| 60 | %USED | A4 | NUMBER |
| 61 | NAME | A1 | STRING |
| 62 | PORT | A1 | NUMBER |
| 63 | RESPONSE | A2 | STRING |
| 64 | TYPE | A3 | STRING |
| 65 | #PROCESSES | A4 | NUMBER |
| 66 | OWNER | A3 | STRING |
| 67 | ARCHIVE | A4 | STRING |
| 68 | NETWORK | A1 | STRING |
| 69 | MASK | A2 | STRING |
| 70 | BOTTOMIP | A3 | STRING |
| 71 | TOPIP | A4 | STRING |
| 72 | ADDRESS | A1 | STRING |
| 73 | RESPONSE | A2 | STRING |

ATTRIBUTE TABLE

FIG. 16 (Prior Art)

MAPPING TABLE

| ELEMENT ATTRIBUTES ||||
|---|---|---|---|
| ELEMENTID | ATTRID | COLLECTORID | REFRESH |
| 2 | 49 | | |
| 2 | 50 | 214 | |
| 3 | 51 | | |
| 3 | 52 | | |
| 4 | 51 | 201 | |
| 4 | 52 | 202 | |
| 5 | 53 | | |
| 5 | 54 | | |
| 6 | 55 | | |
| 6 | 56 | | |
| 7 | 57 | | |
| 7 | 58 | | |
| 7 | 59 | | |
| 7 | 60 | | |
| 8 | 61 | | |
| 9 | 62 | 203 | |
| 9 | 63 | 204 | |
| 9 | 64 | | |
| 9 | 65 | 205 | |
| 10 | 53 | | |
| 10 | 54 | | |
| 10 | 66 | | |
| 11 | 53 | | |
| 11 | 54 | | |
| 11 | 67 | | |
| 101 | 68 | 208 | |
| 101 | 69 | 209 | |
| 101 | 70 | 210 | |
| 101 | 71 | 211 | |
| 102 | 72 | 212 | |
| 102 | 73 | 213 | |
| 103 | 49 | 200 | |
| 103 | 50 | | |
| 104 | 62 | | |
| 104 | 63 | | |
| 104 | 64 | 215 | |
| 104 | 65 | | |
| 105 | 51 | | |
| 105 | 52 | | |
| 106 | 55 | | |
| 106 | 56 | | |
| 107 | 57 | | |

FIG. 17A (Prior Art)

| 107 | 58 | |
|---|---|---|
| 107 | 59 | |
| 107 | 60 | |

| DATA | | | | | |
|---|---|---|---|---|---|
| ELEMENTID | TIMESTAMP | ATTR1 | ATTR2 | ATTR3 | ATTR4 |
| 1001 | 40 | 1.1.1.0 | 255.255.255.0 | | |
| 1001 | 50 | 1.1.1.0 | 255.255.255.0 | 1.1.1.2 | 1.1.1.254 |
| 1002 | 50 | 1.1.1.20 | 25MS | | |
| 1003 | 60 | SOLARIS 2.7 | SUN01 | | |
| 1004 | 80 | 80 | <HTML... | | |
| 1005 | 90 | ROOT | ####### | | |
| 1006 | 100 | 512 | 55 | | |
| 1007 | 110 | SPARC01 | SPARC | 880 | 75 |
| 1007 | 110 | SPARC02 | SPARC | 950 | 45 |
| 1004 | 100 | 80 | <HTML... | APACHE 1.3 | 10 |

COLLECTED ATTRIBUTE DATA
FIG. 21 (Prior Art)

DISCOVERY OF ELECTRONIC ASSETS USING FINGERPRINTS

FIELD OF USE AND BACKGROUND OF THE INVENTION

Large companies with many servers and desktop computers on their networks have trouble in keeping accurate inventories of the assets they control. To fill that need, automated inventory systems have been developed that comprise software running on computers which are coupled to the network. The software determines which IP addresses on a company's networks are "active" meaning they are coupled to active devices. The software then logs onto any devices coupled to the active IP addresses and uses "fingerprints" to determine what kind of operating system the computing device is running. Such systems then log onto the operating systems and use other fingerprints to determine what operating system version the computer is running and which application programs are installed and what versions they are. This is done by looking at the files in the directory structure, the register entries and the list of active processes kept by the operating system. All this information when compared to the fingerprints tells a great deal about the software which is installed on a computer and the versions thereof.

The fingerprints can also be used to determine other things about the system such as the hardware configuration, number and capacity of disk drives, other hardware accessories installed, type of network card installed, etc. These types of information can be obtained from configuration files and drivers present on the system and stored on the hard drive.

As an example of the type of automatic inventory system used to do this type of inventory work, consider U.S. patent application Ser. No. 10/125,952, filed Apr. 18, 2002, entitled APPARATUS AND METHOD TO AUTOMATICALLY COLLECT DATA REGARDING ASSETS OF A BUSINESS ENTITY, published Oct. 23, 2003 as US-2003-0200294-A1, which is hereby incorporated by reference. The technology described in this publication will hereafter be referred to as BDNA or the BDNA automatic asset discovery process or system. It is described in detail herein below under the heading BDNA Automatic Asset Discovery Process.

To just determine which computers are installed on the networks of a client, these prior art automatic inventory systems such as that described in the above cited US patent application can rapidly find out such information once a range of IP addresses is given to the prior art system. However to determine which application software and operating systems and the versions thereof which are installed on each computer is more difficult and time consuming.

For this kind of inventory data to be collected, the automatic inventory system must log onto every computer on the network. The problem with this approach of logging onto all the computers on the network is twofold, first, it adds unnecessary traffic to the network; and, second, it requires that permission to access every computer on the network must be obtained from the appropriate network administrator. For example, there may be 65,000 Windows desktops in an organization. Some of them may be managed by one department and others may be managed by a different department or a outside vendor. In a company with thousands of computers on the network, possibly in different work groups or divisions and with different network administrators, this obtaining of permission can be time consuming and a hassle.

There are prior art inventory systems that do automatic inventory by logging onto computers on a network, but the applicants are aware of no prior art automatic inventory systems which gather information from backup systems.

SUMMARY OF THE INVENTION

The preferred embodiments disclosed herein contemplate using backups of the disk drives of the computers on a company's networks as the source of raw data against which fingerprints are compared for purposes of doing automated inventory of a company's assets. This allows all the computers in the company to be inventoried from a central source of data and without the need for putting overhead traffic on the network to every machine on the network and without the need to obtain permission to access every machine on all the networks of the client. There is no need to obtain permission and user names and passwords to access each machine of a company's network to do an automatic inventory from a backup system which has images of every computer in the company (or at least the ones that have been backed up) stored thereon. This is much faster to accomplish.

The way fingerprints work to determine if a particular piece of software is installed on a computer is to look for certain signature files that will only be in a directory structure if that piece of software is installed.

Because the backups contain a copy of the directory structure of every computer on the network that was backed up, inventory can be done almost as well if not as well from the backups. In other words, if the computer running the automated inventory software (the inventory computer) were logging onto the actual machine (the inventory asset) whose disk drive image is found on the backup tape or backup disk drive, it would be necessary for the inventory computer to have a username and password, log onto the inventory asset and search its directory structure, list of active processes and register entries. At least the directory structure and register entries are stored on the backup image of the hard drive of the inventory asset along with an identification of the machine whose image it is. Therefore, the inventory computer can simply log onto the server or other device which created and/or is storing the backup images and look at the directory structure and register entries of each machine and compare that data with one or more fingerprints to determine which computers have which software installed.

In a typical backup system, a full snapshot of every hard drive is taken at some point in time, and then at subsequent backup times, only the files that have been changed are backed up in an incremental backup. This speeds up subsequent automatic inventory efforts in that they need only go to one source and need only check the incremental data file for changes. Incremental backups at different points in time also provides the ability to do automatic inventory of the system to determine what assets were present at particular points in time in history and what software was installed on them at each historical time considered.

BRIEF DESCRIPTION OF THE DRAWINGS

FIG. 10 is an example of a containment table which defines the system and subsystem relationships within the system.

FIG. 11 is an example of a user defined correlation table which defines which attribute data combinations a user wants views, graphs or other visual widgets of on her display.

FIG. 12 is an example of a collected data table where the collector processes store the instances of collected data.

FIG. 14 is an element tree data structure.

FIG. 15 is an element table that give element names and IDs and pointers to collector programs.

FIG. 16 is a table of attribute names and IDs.

FIGS. 17A and 17B are a mapping table between element IDs attribute IDs and collector IDs.

FIG. 18 is a table mapping element IDs to child element IDs.

FIG. 19 is a fingerprints table that maps element IDs to fingerprint rules.

FIG. 20 is a collectors table that maps collector IDs to the corresponding collection instructions for each attribute mapped to the element and fingerprint currently being processed.

FIG. 21 is an example of a data table that stores collected attribute data.

DETAILED DESCRIPTION OF THE PREFERRED AND ALTERNATIVE EMBODIMENTS

Figure 1:
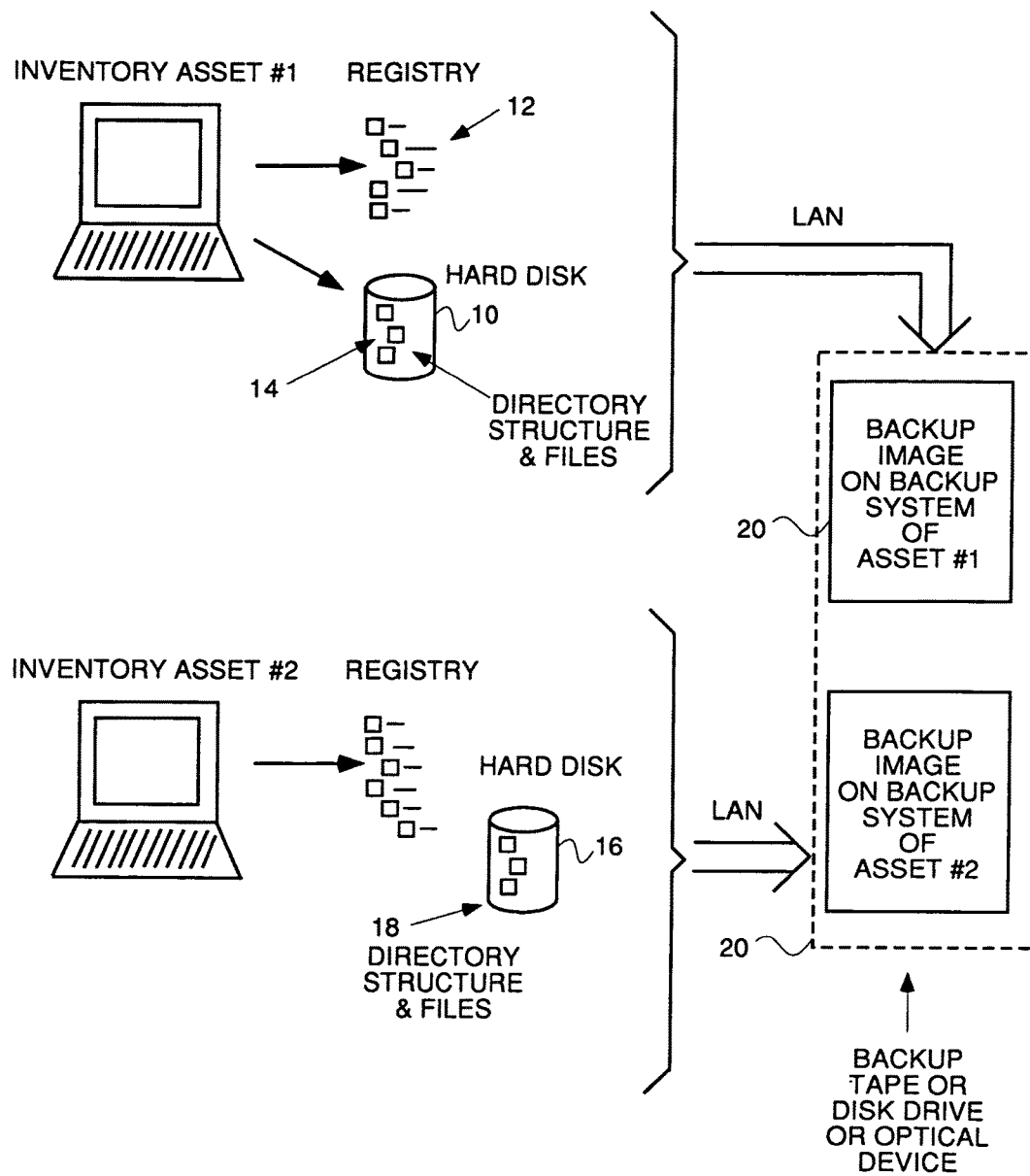
FIG. 1 is a diagram showing symbolically how inventory assets on a local area network of a company have their registry data structures and directory structures and files backed up to images on a backup tape drive, RAID, disk drive or optical device.

FIG. 1 is a diagram showing symbolically how inventory assets on a local area network of a company have their registry data structures and directory structures and files backed up to images on a backup tape drive, RAID, disk drive or optical device. Inventory asset #1 is a computer with a hard disk drive 10 which stores its operating system files, application software files, a directory structure 14 and registry entries 12 made by the operating system. Inventory asset #2 is also a computer with a hard disk drive which stores its operating system files, application software files, a directory structure and registry entries made by the operating system. The files of the operating system and the application programs for inventory asset #1 are all stored on the hard disk 10 in the directory structure 14. The files of the operating system and the application programs for inventory asset #2 are all stored on the hard disk 16 in the directory structure 18. The registry entries 12 for asset #1 are also stored on the hard disk 10, and the registry entries for asset #2 are also stored on the hard disk 16. All of the files on hard disk 10 have duplicate files on backup image 20 on backup device 22. All of the files on hard disk 16 have duplicate files on backup image 24 on backup device 22.

Process to do Automatic Inventory from Backup System Images

Figure 2:
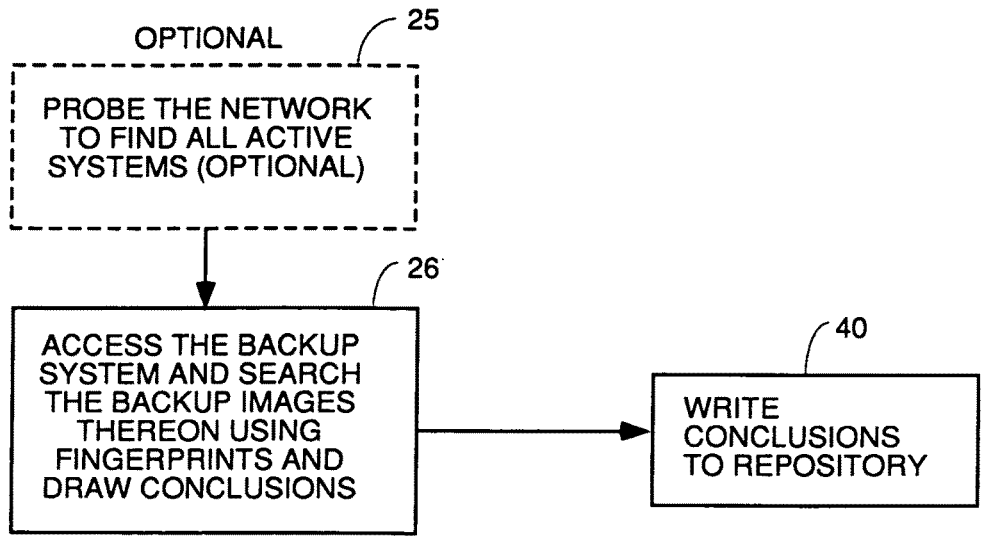
FIG. 2 is a flowchart of the process carried out by an automated inventory system according to the teachings of the preferred embodiment to carry out an automated inventory process using backup images on a backup system.
Figure 3:
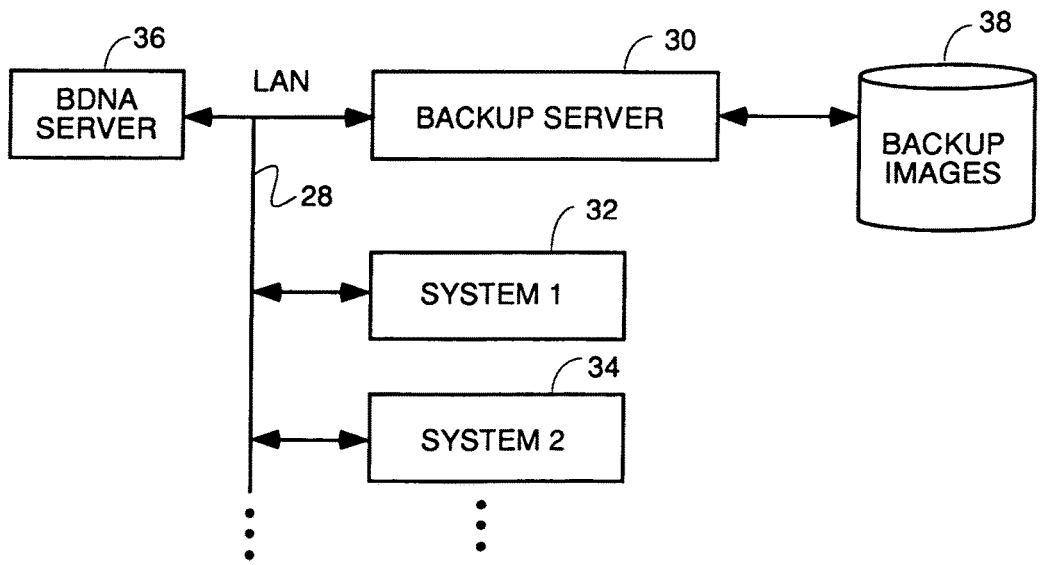
FIG. 3 represents a block diagram of a typical customer local area network configuration showing a plurality of active computers coupled to each other and to a backup server and to an automatic inventory server by a local area network.

FIG. 2 is a flowchart of the process carried out by an automated inventory system according to the teachings of the preferred embodiment to carry out an automated inventory process using backup images on a backup system. Those skilled in the art will understand that the process depicted in FIG. 2 as well as other processes described in this patent application, are typically implemented by reading computer-executable instructions stored on a computer-readable medium into memory, and then executing those instructions to carry out the processes described herein. FIG. 2 represents, in one species, the same process as is described in U.S. patent application Ser. No. 10/125,952, filed Apr. 18, 2002 but using backup tapes or backup images on a backup server of the computing systems on a network as the source of the data from which an inventory will be generated. The technology of U.S. patent application Ser. No. 10/125,952, filed Apr. 18, 2002 is described below under the heading BDNA Automatic Inventory Asset Discovery System. FIG. 3 represents a block diagram of a typical customer local area network configuration showing a plurality of active computers coupled to each other and to a backup server and to an automatic inventory server by a local area network. Local Area Network (LAN) 28 couples a backup server 30 to a plurality of active systems, of which computers 32 and 34 are typical. A BDNA server 36 stores the automatic inventory software described in U.S. patent application Ser. No. 10/125,952, filed Apr. 18, 2002 and fingerprints needed to examine the directory structure and registry entries on a computer's hard disk or on a back image of the hard disk stored on a backup system and determine the type and version of the operating system and application software stored thereon.

In FIG. 2, step 25 represents the optional process of probing the network to find the IP addresses thereon which are active, i.e., a device, computer or computing system has been assigned this IP address (either permanently or by a DHCP server) and is responding to packets addressed to that IP address. In one embodiment, the processing of probing the network to find all the active systems is comprised of the following steps. First, one or more network fingerprints to determine the existence of one or more networks are used to determine how many and what types of networks a client has. Network fingerprints determine the type of networks by how the network responds to certain commands unique to particular types of network operating systems. Networks have operating systems which integrate the network's hardware components, and usually include menu-driven administration interface, tape backup of file-server software, security restrictions, facilities for sharing printers, central storage of application programs and databases, remote log-on via modem and support for diskless workstations. The particular attributes a network operating system has can be detected by the network fingerprints and indicate what type of network exists. Network fingerprints can also determine the type of network by using data gathered from the network file system or application programmatic interface (such as NetBIOS for IBM or Microsoft based networks or Network File System developed by Sun which enables users of Unix and Windows NT to access files and directories on other computers on the network). The fingerprints are used to determine the type of network which is in place. The network fingerprints also determine the valid addresses on each discovered network, typically by sending "pings" to network addresses and determining which addresses respond with a valid response. The data gathered about the type and number of networks and the valid network addresses are stored in element and data tables recording the attributes of each discovered network.

After the valid addresses are discovered, one or more network interface card fingerprints are used to probe all the valid network addresses to determine all the network interface cards that exist on each discovered network and the attributes of each. The gathered data for each network interface card is stored in a data repository.

Then, for each network interface card found, step 26 in FIG. 2 is performed to access the backup disk drive images and use fingerprints to examine each file system stored on the backup images for the computing systems coupled to each network interface card found. The fingerprints are used to determine the type of operating system installed and the hardware and software configuration of the computer upon which the operating system is installed.

The probe step 25 is optional since an automatic inventory can be made simply from the backup images assuming every computing system on the network has a backup image.

The term "computing systems" as used in the claims means any programmable or programmed device which can be connected to a network and has a configuration of interest for purposes of doing an inventory of corporate or government assets. Computing systems include servers, desktop computers, printers, copiers, routers, plotters, numerically controlled machines, etc. The computing systems of most interest for purposes of practicing the various embodiments are computers with hard drives which can be accessed over said network for purposes of making a backup of at least the directory structure thereof and preferably the registry entries if the computer is a Windows based machine or some other type of machine which keeps a registry.

Step 26 represents the process of accessing the backup system and comparing the files in the directory structure of the backup images of the computing system on the network stored on the backup system to fingerprints stored in the automatic asset discovery application program. To do this, access to the backup system is gained. This can be by physically taking possession of backup tapes or being given access privilege to the backup servers. Then, every fingerprint is compared to every backup image typically in some embodiments. In other embodiments, only fingerprints pertinent to a particular machine type or OS type are used to search each backup image once the fingerprints are used which determine which type of machine and operating system it is. Every computing system on the network which has been backed up will have a backup image on the backup system. If one assumes that every computing system on the networks of a customer has been backed up, then there is no need for step 24 and a complete automatic inventory can be done simply by performing step 26.

Step 26, like the search steps in every embodiment, can be done by searching the backup images on the backup server or by importing the backup images either one at a time, in groups or en masse to the BDNA system where they are searched. The search process of using fingerprints to examine registries and directory structures in all the embodiments disclosed herein can be the same as is described in the BDNA process of U.S. patent application Ser. No. 10/125, 952, filed Apr. 18, 2002, entitled APPARATUS AND METHOD TO AUTOMATICALLY COLLECT DATA REGARDING ASSETS OF A BUSINESS ENTITY, published Oct. 23, 2003 as US-2003-0200294-A1 or some other equivalent process.

Each fingerprint gives the names of files that must be present in a directory structure if a particular version of an operating system or application program is installed on the machine. Other fingerprints will give the names of drivers for various hardware components such as hard drives, optical drives, network cards, user interface equipment, etc. Comparing the fingerprint for a particular operating system and version thereof or application program and version thereof or the fingerprint for a particular hardware device to the files found in the directory structure (and registry in some embodiments where Windows backup images are present) of the backup image will lead to a conclusion as to whether that particular operating system and version or that particular application program and version has been installed on the computer system and what other hardware configuration the computing system has. Thus, by comparing a plurality of fingerprints that indicate what files will be present in a directory structure if various software or hardware configurations are present, it is possible to determine the hardware and/or software configuration of a computing system. If only hardware configuration fingerprints are used, only the hardware configuration will be learned. If only software configuration fingerprints are used, only the software configuration will be learned. If both software and hardware fingerprints are used, both the hardware and the software configurations can be learned. Further, if the type of operating system and/or type of computer system is known, the number of fingerprints used in the search can be limited to the fingerprints which are known to be applicable to the particular operating system and/or computer type. For example, if the operating system is known to be Windows, there is no need to use any Solaris or Macintosh OS fingerprints or fingerprints for hardware or application software which are known could not be present on such a system.

In some alternative embodiments, a step of finding backup images of the hard drives of the active computers on the network found in step 24 is performed to make sure a backup image for every active computing system exists. In another alternative embodiment, step 25 can be eliminated, and all backup images on the backup system can be searched and compared to the fingerprints.

In any embodiment, the search of backup images on the backup system involves using fingerprints stored on the BDNA server 26. A search involves comparing the names of files in the directory system to the lists of files in the fingerprints for every type of application program and every type of operating system. This comparison determines which operating system and application programs are stored on a computer and the version thereof because each operating system and version thereon has certain files which must be stored, and the names of these files are listed in the fingerprint. The same is true for application programs. The same holds true for entries in the registry. If a particular application program is installed, it will have predetermined entries in the registry, and these entries are listed on the fingerprints.

These searches or comparisons of directory structures and register entries to fingerprints can just as easily be done on the backup images 38 of the hard drives stored on the backup system 30 as on the actual hard drive itself. In fact it is easier to search the backup images than all the computer hard drives on the network because all the backup images are in one place and there is no need to obtain separate user names and passwords to access every computer on the network.

These searches will result in conclusions being drawn by the automatic inventory software running on the BDNA server 36 as to which operating system (and version thereof and which application programs (and version thereof are installed on each computer system which has a backup image stored on the backup server 30. These conclusions will be written to a repository in step 40. This repository can be a catalog of active systems and their installed software or any other form of record.

Figure 4:
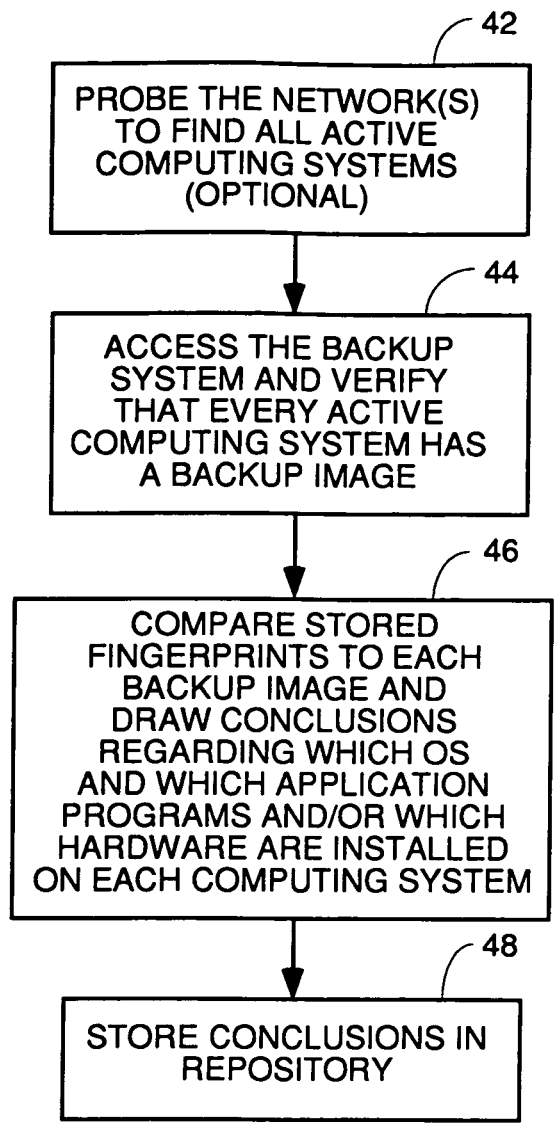
FIG. 4 is a flowchart of the process of an alternative embodiment where the network(s) are probed by the automatic asset discovery program to determine which computing systems are present and then discovery is done on the backup images of the active computer systems.

FIG. 4 is a flowchart of the process of an alternative embodiment where the network(s) are probed by the automatic asset discovery program to determine which computing systems are present (step 42). Then the backup system is accessed in step 44 and the backup images are checked to verify that every active computing system has a backup image present on the backup system. In step 46, at least some of the stored fingerprints are compared to each backup image of an active computer system to compare the information stored in each fingerprint to the directory structure file list and registry entries in the backup image. Conclusions regarding the hardware and/or software configuration of the machine are then drawn, e.g., which operating system and which application programs are installed on the machine corresponding to each backup image, which network card, how many CPUs and their speed, how many hard disks and their capacity, etc. After these conclusions are drawn by the automatic asset discovery system, the conclusions are stored in step 48. In some embodiments, the stored fingerprints are used in two phases. In a first phase, fingerprints are used which enable determination of which operating system and machine type are coupled to each active IP address. Once that is figured out, a second phase compares only fingerprints which are pertinent to the operating system and machine type determined in the first phase to discover its software and/or hardware configuration. In other embodiments, all fingerprints are used on each active computing system to determine what type of machine and OS is present and its software and/or hardware configuration.

Figure 5:
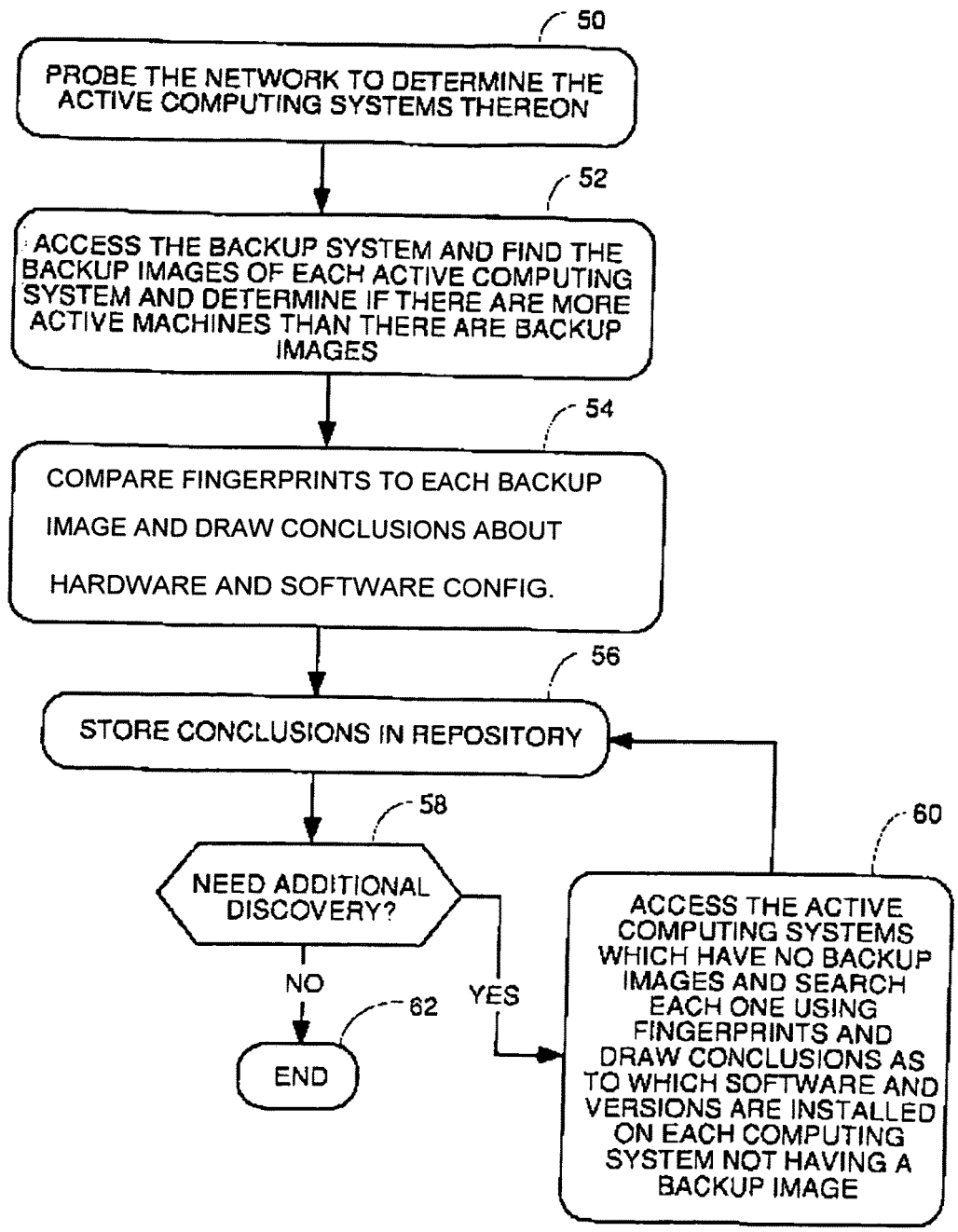
FIG. 5 is a flowchart of the process of an alternative embodiment where additional discovery can be performed on the network if there are other assets on the network which do not have backup images stored on the backup system.

FIG. 5 is a flowchart of the process of an alternative embodiment where additional discovery can be performed on the network if there are other assets on the network which do not have backup images stored on the backup system. Step 50 is a conventional level 1 probing of the network to determine which IP addresses are coupled to a live computer as in the embodiment of FIG. 4, and which operating systems they are running. The probe step results in a list of active computing systems that are responding to packets addressed to their network addresses.

Step 52 represents the process of accessing the backup system and verifying that every active computing system found in the probe step has a backup image present on the backup system and a list of which active computing systems (which may include printers, routers etc. with no hard drives) which do not have backup images on the backup system.

Steps 50 and 52 are optional and can be omitted in some embodiments. In embodiments where step 50 is performed, the structure and topology of the network is discovered, and this forms the basis for doing additional discovery in step 60. Step 50 typically uses some application like OpenView Network Node Manager to discovery the topology of the network and which IP addresses have attached devices. The network topology data from OpenView Network Node Manager will be extracted and imported into the BDNA automatic asset discovery process and mapped to a data structure in the BDNA repository.

Step 54 represents the process of comparing one or more stored fingerprints against the backup images on the backup system to determine the hardware and software configuration of each system having a backup image. In some embodiments, all available stored fingerprints are compared against all backup images. In other alternative embodiments, step 50 is performed before step 54, and the type of operating system for each backup image will be known. Using this information, only fingerprints pertinent to that operating system and machine type will be used in step 54 for further discovery.

Step 56 represents the process of storing the conclusions regarding the hardware and software configuration of each machine having a backup image in a repository.

Test 58 represents the process of determining whether there is a need for additional discovery. In some embodiments, additional discovery will be performed whenever there are more active machines found in the probe stage than there are backup images stored on the backup system. In other embodiments, the automated asset discovery system will notify the operator that there are more active computing systems than there are backup images that have been searched and ask if the operator wants to do additional discovery. This embodiment is useful when inventories are sometimes needed just for servers and desktop computers and there is no need for information about routers, printers, plotters, copiers, etc. In other embodiments, the operator may simply know that the inventory developed from scanning the backup tapes will not provide a complete inventory and will simply manually schedule additional discovery. The additional discovery may be: network discovery of only systems not found on the backup system or detailed discovery of systems not found on the backup or detailed discovery of all systems including systems found on the backup. For example, a user may be entering software license negotiations for renewal of a corporate license and may want a quick snapshot of what software from that vendor the company is using before the negotiation. That can be obtained by using the backup tapes as a source for discovery. Later, full discovery may be desired for deployment of the software or for other reasons. Another example would be where some information is not available from the backup files because the application program must be run to interpret the data on the backup files. For example, Oracle software must be run to interpret the data on backup files. If it is desired to know what users exist in an Oracle database, the backup tapes will contain the files of the Oracle application program and the data of its database files. But that data will be in an Oracle specific format which only the Oracle application can interpret. Therefore, additional discovery may be necessary in that situation if data is to be interpreted when only running the Oracle software on that data will allow such an interpretation to occur.

If additional discovery is to be done, step 60 represents the process of accessing the active computing systems (or operator selected ones in some embodiments) which have no backup images and searching each one using fingerprints. Conclusions are then drawn as to the hardware and software configuration of each computing system so accessed. The conclusions are then stored in step 56. If step 58 determines that no additional discovery is to be done, the process ends at 62. This additional discovery can also be performed on system on the client network which also have backup images stored on the backup drive so as to discovery software that cannot be discovered by examining the backup image such as software installed on a network drive which has no local files on the system's hard disk. Some software may only be discoverable by logging onto a running system and checking the process list of software that is running which is maintained by the operating system. Some software has no installer to run it and there is no registry entry for such software, but it will appear in the process list. Other software such as Oracle database applications may have data files stored on the backup system, but it is not possible to tell which modules are installed and which users have access from the data files alone. This information can only be discovered by accessing the system when Oracle is running and doing discovery on it.

Incremental Backups and Historical Inventories

In a typical backup, a full set of copies of all files are made at some particular time, and then incremental backups are made subsequently periodically. During the incremental backups, only the files which have changed are backed up. This provides the capability to request from the backup system a backup of the hard drives of all assets in the system at any historical time for which an incremental backup was made.

Integration of Data from Other Applications into a BDNA Inventory

Figure 6:
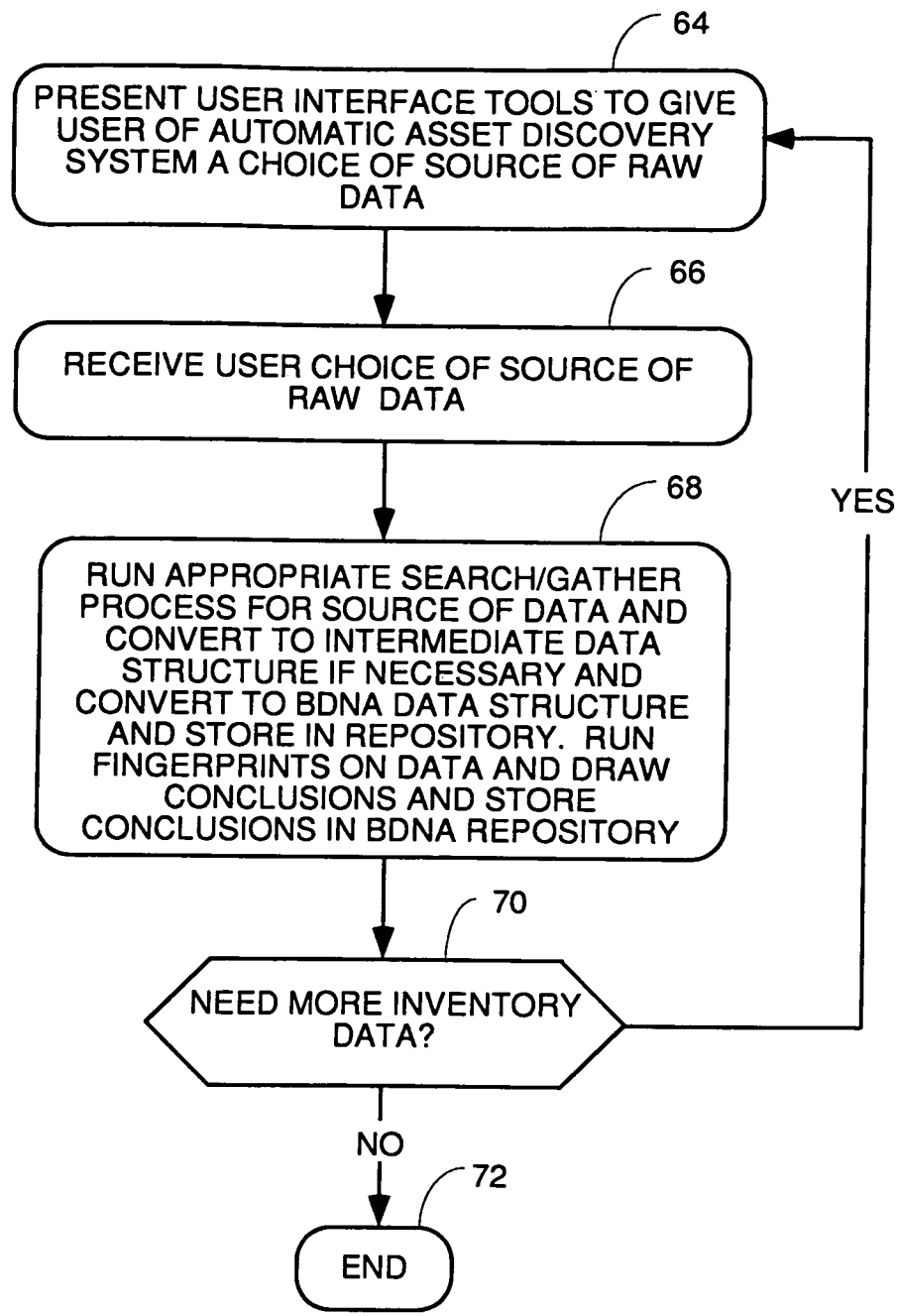
FIG. 6 is a flowchart of an embodiment of a process wherein multiple sources of raw data for inventory are available, and a user is given a choice of which source she wants to use and then automatic inventory is done from that source.

FIG. 6 is a flowchart of an embodiment of a process according to the teachings of an embodiment wherein multiple sources of raw data for inventory are available, and can be integrated into a unified inventory of the assets of a company conducted by the BDNA system for automatic discovery of assets. In this process, a user is given a choice of which source she wants to use such that data about computers and other components coupled to a network which are not inventoried by the BDNA system for automatic discovery of assets can be gathered from other applications that already have or have the capability to gather information from these sources which BDNA may not have fingerprints for. Data can be gathered from these non-BDNA systems and then integrated into data gathered by the BDNA automatic inventory on other sources. For example, the BDNA system may not have fingerprints stored for a newly released printer or router, but these devices have SNMP capability and SNMP enabled software can gather attribute information from these devices. This data can be integrated into the BDNA system inventory using the process of FIG. 6.

Step 64 represents the process of presenting user interface tools to give a user a choice of automatic inventory from backup tapes, automatic inventory from the actual computing systems active on the network, a combination of automatic inventory from backup images plus additional discovery from active computing systems on one or more networks, or importing network topology data or attribute data gathered from other applications. Automatic inventory from actual computing systems on a network is known and is described in the patent application incorporated by reference. Automatic inventory from backup images or from a combination of backup images and actual computing systems on a network or importing network topology data from another application process is new. Third party applications such as Open View Network Node Manager can explore a network and develop network topology data and determine which IP addresses are coupled to active computing systems which are responding.

Other third party applications like SNMP have the capability to do a form of automated discovery of attributes of any system on a network that is SNMP compatible and can gather information about these systems which is useful in an automated inventory of the assets of a company. For, example SNMP may be able to gather data about some component on a network for which no fingerprints yet exist, so the BDNA automatic asset discovery software (the BDNA software) cannot gather any data about such a component. In such a case, the operator can select the application that has or is capable of gathering SNMP data about devices the BDNA software cannot investigate.

Likewise, Open View Network Node Manager may be available and have already gathered network topology data and a list of IP addresses to which active systems are coupled. This is the same sort of data as is developed by phase 1 discovery by the automated asset discovery process of the patent application incorporated herein by reference. Because this data may exist on such other applications already, there is no sense in conducting phase 1 automatic discovery using the BDNA software to develop network topology data and determine which IP addresses are responding. Instead, this data can be gathered from the Open View Network Node Manager software which may have already gathered network topology data. In the claims, this type of software not manufactured by the assignee which can gather network topology data is referred to as network topology third party software. Further, attribute data about assets the BDNA software has no fingerprints for can be gathered from third party SNMP enabled software. This process is represented by step 68 described below.

Other third party application software which can gather network topology data and attribute data regarding systems on the network which is useful in an inventory of a company's electronic assets are: Tivoli Netview; ISS Internet Scanner; Poundstone Poundscan. Detailed operations monitoring software which can gather inventory data useful to a full inventory are: Tivoli Monitoring; Open View Operations; SMS Detailed Inventory. Other systems gather financial data.

Step 64 presents choices to a user to allow the user to do automatic discovery from only backup images, do automatic discovery from actual computing systems on one or more networks by logging onto these systems, select a third party application to gather network topology data only or to supplement this day by then doing automatic discovery from active computing systems or from backup images, or some combination of the above.

Step 66 represents the process of receiving user choice of source of raw data. The form of user interface mechanism and command structure is not critical.

Step 68 represents the process of running the appropriate process for the selected source of data to do an inventory using fingerprints or to import data from a third party application and convert said data to an intermediate data structure and then convert the intermediate format data to the BDNA data structure if necessary.

Step 70 represents the process of determining if more inventory data is needed than has been gathered from the first selected source. If so, processing returns on line 74 to step 64 wherein the user interface tools to select another source for data are once again displayed. The process from there then repeats as described above. If the user needs no further data and so indicates in step 70, step 72 is performed where the process ends.

Figure 7:
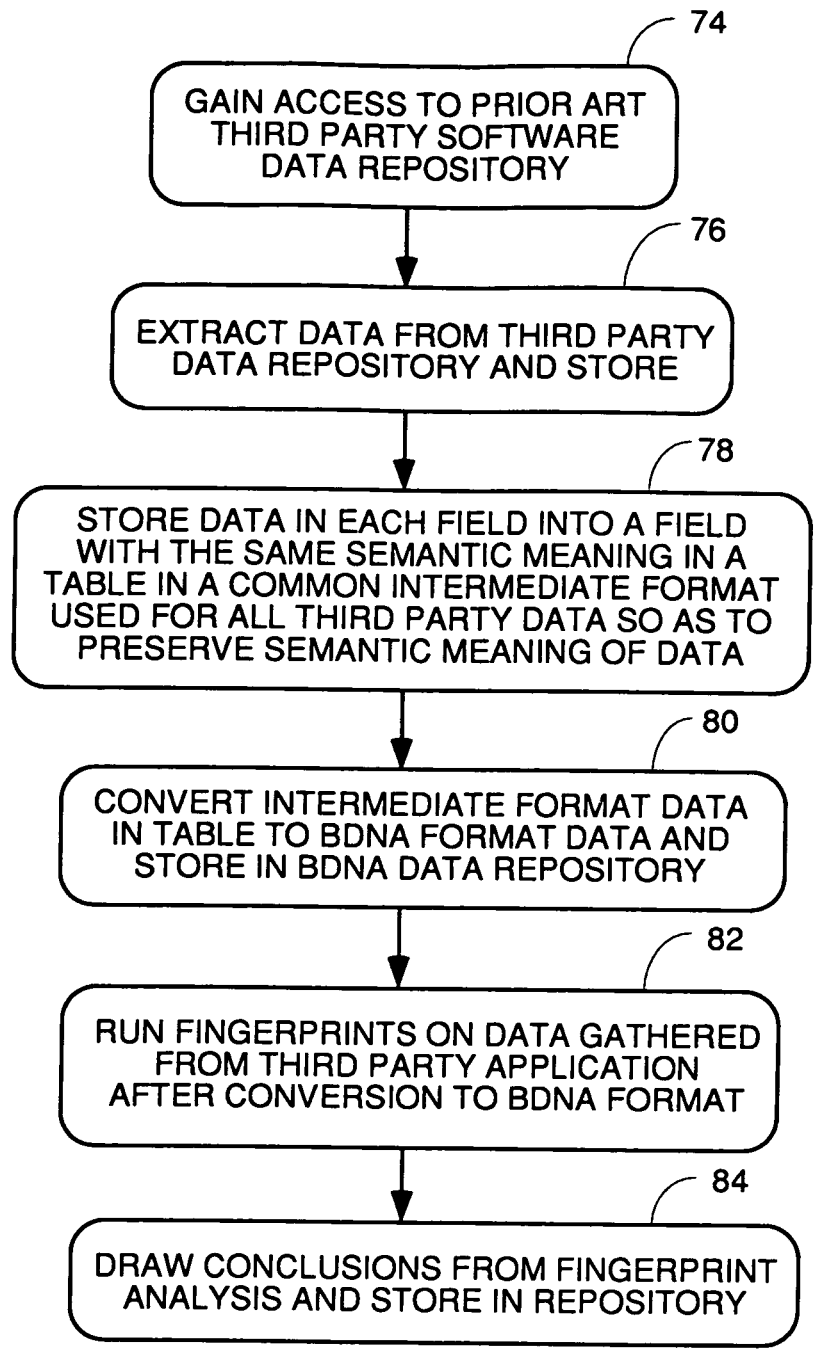
FIG. 7 is a flowchart of the core process of step 68 in FIG. 6 when the source selected from which to gather data is some third party application that has gathered some data in a format which is foreign to the BDNA automatic asset discovery system.

FIG. 7 is a flowchart of the core process of step 68 in FIG. 6 when the source selected from which to gather data is some third party application that has gathered some data in a format which is foreign to the BDNA automatic asset discovery system. In some instances, the data gathered from third party applications must first be converted to an intermediate data format and then converted from the intermediate data structure to the BDNA data structure. The conversion of gathered data to an intermediate data structure is necessary only when data is gathered from some third party application such as Open View since the BDNA software will put any inventory data it gathers into a data format in a data repository which the BDNA software understands and supports. In contrast, third party applications store gathered data in a data format which is meaningful usually only to the application which gathered it. In order to use that data, it must be converted to some intermediate data format and then converted (or converted directly) into BDNA format data.

All these third party applications that gather network topology information gather information about which IP addresses are active, network node information regarding what the topology of the network is and on which particular branch of a network a node is located. Some of the applications give the type of operating system at every node and most if not all include data on the network name of each node located on the network. Each of these third party applications puts the data it gathers into a data format peculiar to that particular application. To convert this data to a form useable by the BDNA software, it must be converted to BDNA format data. This process begins in step 74 where access to the third party software data repository is gained. In step 76, data gathered by the third party software and stored in its repository is extracted and stored in any temporary storage. Step 78 converts the data extracted from each field of each record stored by the third party software to data in a table having the same semantic meaning. This table is a common intermediate format for data gathered from third party applications. Step 78 represents the mapping of the foreign format data into the intermediate format in a manner to preserve the semantic meaning. Step 80 represents the process of converting the intermediate format data in the table to BDNA format data and storing it in the BDNA repository. This is also a mapping from the intermediate format to the BDNA data format so as to preserve the semantic meaning. In step 82, the fingerprints of the BDNA automatic asset discovery system are applied to the newly converted data generated in step 80. Conclusions from the fingerprint analysis are drawn in step 84, and these conclusions are stored in the BDNA repository.

The data format of the data gathered by a third party application is then mapped into a common intermediate format such that semantic meaning of the data is preserved. That common intermediate format is then stored in a table in the BDNA Automatic Asset Discovery System.

BDNA Automatic Asset Discovery System

Figure 8:
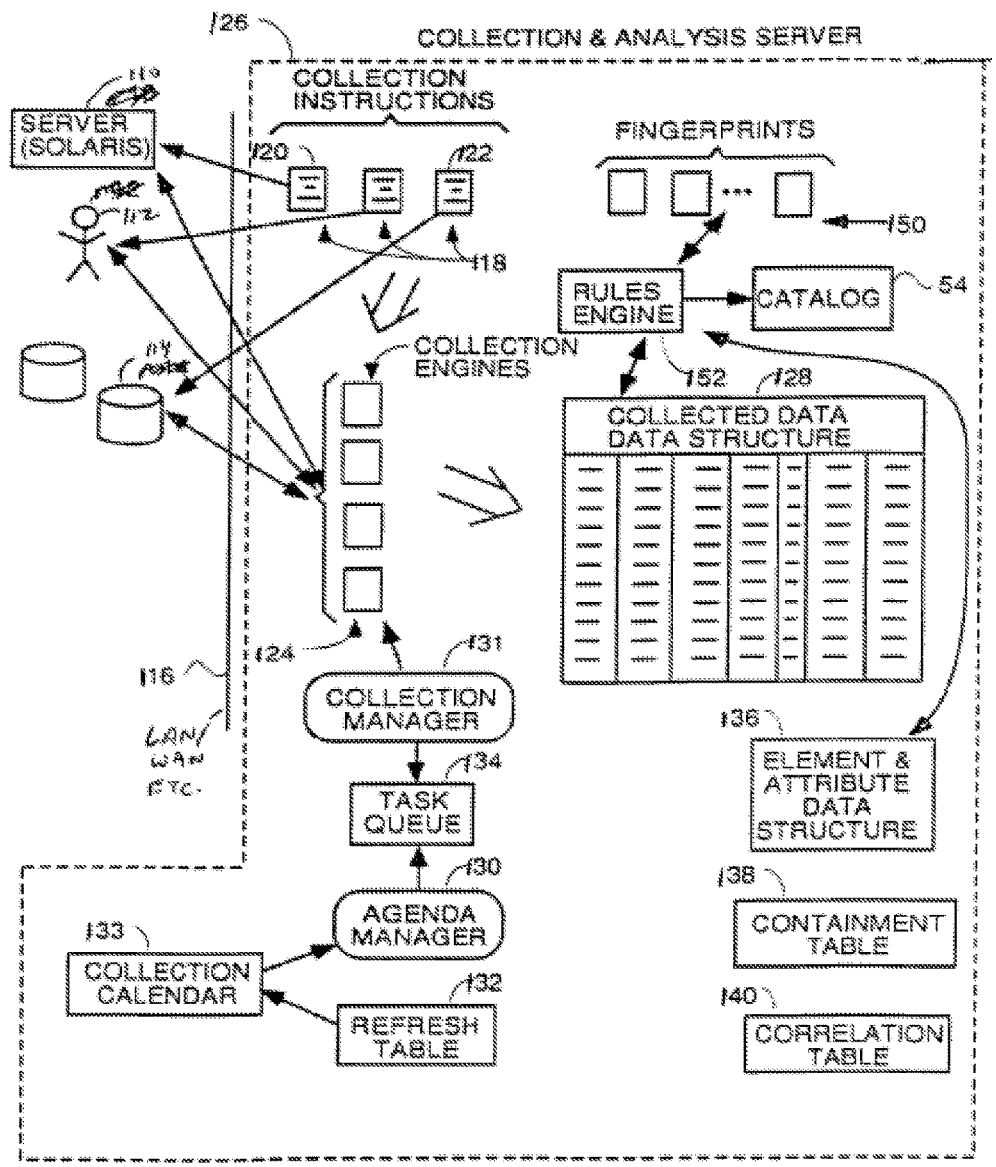
FIG. 8 is a block diagram illustrating the environment in which the various embodiments taught herein works and some of the key elements.

Referring to FIG. 8, there is shown a block diagram illustrating the environment in which the various embodiments described herein works. FIG. 8 illustrates schematically the most important elements of a system within the teachings of the preferred embodiment which can automatically retrieve attribute data and determine from it the makeup or business DNA of the organization. In other words, a system like that shown in FIG. 8 can automatically determine the number and type of computing hardware assets, installed software, key elements of information about the organization and extract key information from the organization's leases, contracts, licenses, maintenance agreements, financial statements, etc. This can be done directly from the networks of the company, or from backup tapes or backup disks or disk arrays that contain images of the data in the file systems of all the computers on the networks and other computing devices on the networks if they also have backup images of their files systems on the backup system.

Essentially, all the important information that defines the makeup or "genes" of a business organization or government can be automatically gathered and assets automatically identified from their attributes. This information can be periodically regathered to present an up-to-date picture of the makeup of an organization to management at substantially all times.

The sources of data from which information is to be collected in this particular organization are server 110, person 112 and file system 114 of one or more computers on one or more networks of the company, government entity, etc. File systems are the collection of directories of files stored on the hard disk of every computer system which detail where to find every program, document, spreadsheet, configuration data file, etc. of every application program and the databases, emails, documents, spreadsheets etc. which these application programs are used to create and process. All these sources of data are connected together by a data path such a local area network 116 (which can be fully or partially wireless local area network, wide area network, internet, etc.) and suitable interface circuitry. In the case of a human source of information, the human uses a workstation including a network interface card and an e-mail application through which the BDNA Automatic Asset Discovery System can communicate with the human. None of the prior art hardware and software for operating the server 110 or the data path 116 forms part of the embodiment described here and is only the environment in which the embodiment works. For that reason, it is not described in detail.

Everything to the right of line 116, representing the data path, represents processes, programs or data structures within a collection and analysis server 126 which implements the methods and apparatus of the embodiments disclosed herein (also called the BDNA server or BDNA). Typically this server is located at the customer premises, but, in some embodiments, it could be located remotely and make connections to the local area network of the customer via the internet or a dedicated WAN connection. Connections through the internet are more difficult to implement because businesses typically have firewalls and other security measures that must be dealt with before access to the internal LAN by a foreign computer will be granted.

A set of collection instructions, indicated generally at 118, are definitions and programs which serve to define what types of information can be gathered from each source and methods and protocols of doing so. For example, collection definition 120 may be for a server running a Solaris operating system and may define that one can get files, file systems mounted and processes currently in execution from such servers. Collection definition 122 for the file system 114 contains data indicating such things as the file system partitions, partition size, partition utilization, etc. can be gathered from the file system 114. The collection definitions then give specific step by step instructions to be followed by data collector processes, shown generally at 124. These collectors are processes in the collection server which can establish connections over existing protocols 116 to the various data sources under the guidance of the collection instructions 118. These processes actually collect the desired information needed by the system to identify which assets are present and extract information that management desires to see from people and documents. The collection instructions contain specific program instructions which control the collector processes 124 to traverse the network and communicate with the data source using the proper protocols and invoke predetermined function calls, read predetermined files or send predetermined e-mails addressed to specific people to extract the information needed.

The data collectors 124 can be any processes which are capable of running the program instructions of the collection instructions. The data collector processes (collection engines) must be capable of communicating with the data source devices, people or processes identified in the collection instructions using the necessary protocol(s). Those protocols include the various software layers and network communication hardware interface or gateway coupled to the collection and analysis server 126, the network protocols of whatever data path 116 the communication must traverse and the protocols to communicate with the appropriate process at the data source such as the operating system for server 110, the e-mail program of person 112 or the appropriate process in file system 114. Any collection process that can do this will suffice.

In the preferred embodiment, the data collectors 124 are generic prior art "scrapers" which have been customized to teach them to speak the necessary protocols such as TCP/IP, SNMP, SSH, etc. which may be necessary to talk to the various data sources in the system.

Each data collection process 124 is identical in the preferred embodiment, and they are assigned to data collection tasks on availability basis. In the preferred embodiment, all the common processing is put into the data collectors such as libraries or adaptors for the different protocols the collector might have to use such as TCP/IP, IP only, UDP, Secure Sockets, SNMP, etc. This way, the collection instructions need not include all these protocols and can concentrate on doing the steps which are unique to gathering the specific data the collection instruction is designed to collect.

In alternative embodiments, only the protocol libraries necessary to gather the particular data a collection instruction is designed to gather can be included in the collection instructions themselves. In other embodiments, the protocol libraries or adaptors can be shared by all the data collector processes and just accessed as needed.

Typically, data collection requests are queued and as a data collector process, running locally or across the network, becomes available, it retrieves the next data collection request and the appropriate collection instruction for that request if it has support for the requested collection protocol. Then it executes the collection instructions therein to retrieve the requested data and store it in the appropriate location in a collected data storage structure 128. In alternative embodiments, a single collection process can be used that has a queue of collection requests and processes them one by one by retrieving the appropriate collection instruction for each request and executing the instructions therein.

Figures 11, 12:
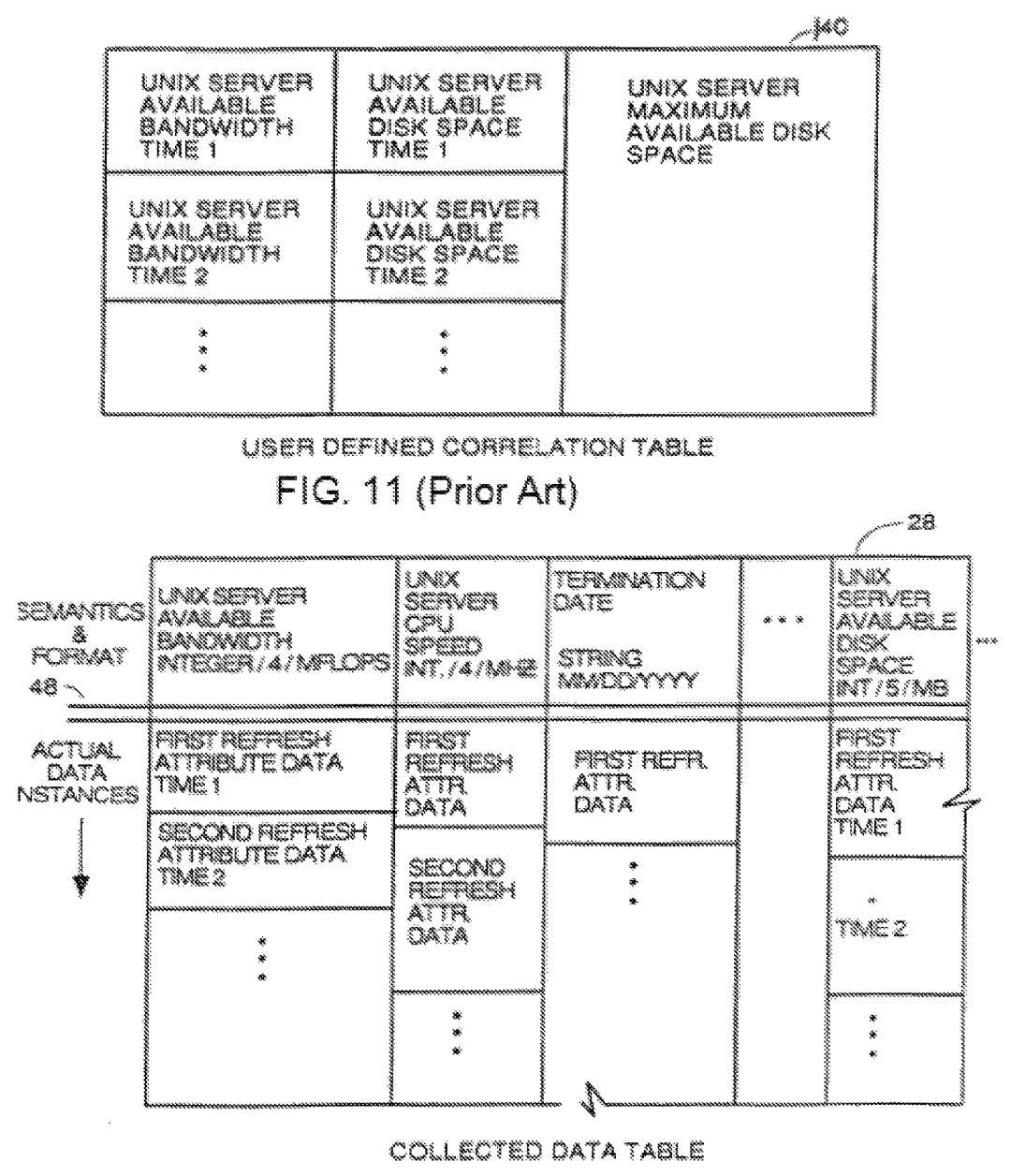

Collected data structures 128, an example of which is shown in FIG. 12, serve as the initial repository for the collected data obtained by the collectors. This is typically a table which has a column for storage of instances of each different attribute, with the rows in the column storing the value of that attribute at each of a plurality of different times. The intervals between the instances of the same attribute data vary from attribute to attribute, and are established by a refresh schedule in refresh table 132 in FIG. 15. Typically, all attributes are collected repeatedly on a "refresh schedule", subject to a collection calendar that drives at what time, day, and date collection shall take place. This allows analysis of how the value of an attribute changes over time.

An agenda manager process 130 consults the refresh schedule for each attribute in a refresh table 132 and also consults a collection calendar 133 to determine times and dates of collection of attributes. If this schedule data indicates it is time to collect an attribute, the agenda manager 130 puts a collection request in a task queue 134 for collection. A collection manager 131 periodically or continually scans the task queue 134 for tasks to be accomplished, and if a task is found, the collection manager 131 gets the task from the task queue 134 and retrieves the appropriate collection instruction for the requested attribute and executes its instructions using an available one of the collection engines 124. The collector then retrieves the data and stores it in the next available row of the column in collected data tables 128 that store instances of that attribute.

Figure 9:
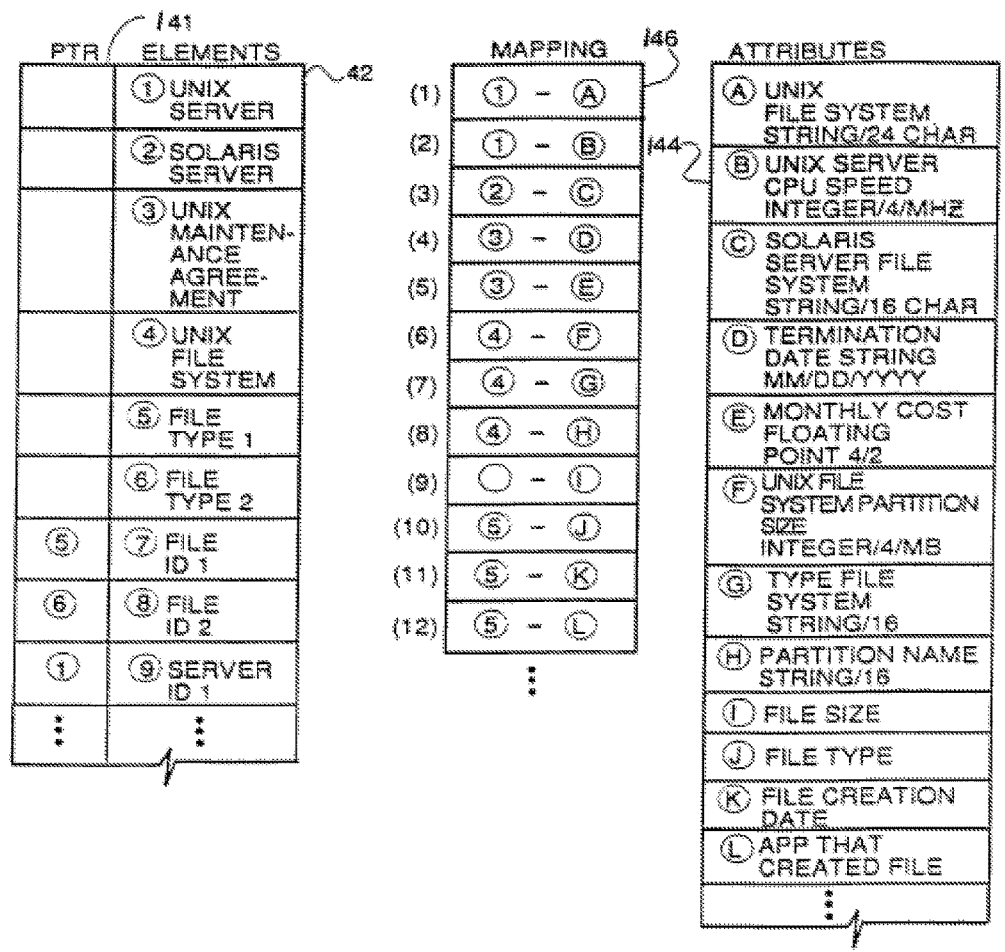
FIG. 9 is an example of the element/attribute data structure which defines the elements and defines the attributes of each element with semantic data and format data.

Each column in the collected data table is designed to receive only attribute data of the type and length and semantics defined for the attribute in an element/attribute data structure 130. In other words, each attribute has its instances stored in only one column of the collected data table, and the instance data must be in the format defined in the element/attribute data structure of FIG. 9. If the collected attribute data is not in the proper format, it is post processed to be in the proper format before it is stored in the collected data table. This makes it easier to write programs that deal with the collected data because the programmer knows that all instances of a particular attribute will have the same format. In FIG. 16, the semantics of the attribute stored in each column and format data which defines the type of data, length and units of measure defined in the element/attribute table of FIG. 9 are listed as are the actual attribute data instances for each attribute are stored in each column.

An element/attribute data structure 136 stores element entries for all the elements the system can identify and defines the attributes each element in the system has. The data structure 136 also serves as a catalog of all the instances found of a particular element type. An example of an attribute/element data structure 136 is shown in FIG. 9. In the preferred embodiment, this data structure is comprised of three tables. The first table, shown at 141 in FIG. 9, has an entry for each element definition and an entry for each instance of an element that has been found by the system with a pointer to the element definition. For example, elements 7 and 8 are file instances that have been found with pointers to element entries 5 and 6, respectively. This means that the file which the system found and gave an element identification File ID 1 is an instance of file type 1 defined by the attributes mapped to entry 5 in the element column. Likewise, the file instance found by the system and entered as an element at entry 8 is an instance of file type 2 defined by the attributes mapped to and which define the file element at entry 6. Likewise, the system found a server and assigned it ID 1 and made an entry at 9 in the element table. This entry has a pointer to entry 1 indicating the server instance at 9 is a UNIX server defined by the attributes mapped to entry 1. Only instances of elements have pointers in pointer column, and these instances define the elements that have been found in the system. The elements with pointer entries are a catalogue of everything that makes up the company.

Typically, the element definition will be semantic data naming the element or telling what the element is. Each element has one or more attributes which are defined in a second table shown at 144. Semantic data and form data in each entry of this second table names the attribute defined by that entry or defines what it is and what form the attribute data is to take, e.g., floating point, integer, etc. For example, entry A in this table is an attribute named Unix file system. This name is a string of alphanumeric symbols 24 characters long or fewer. Entry B is an attribute named UNIX server CPU speed which will be an integer of 4 digits or fewer with units of mHz. Entry E is an attribute named monthly cost which will be a floating point number with 4 digits to the left of the decimal and 2 digits to the right. These definitions are used to post process gathered data to the format of the definition for storage in the collected data table 128. The third table, shown at 146, is a mapping table that defines which attributes in the second table belong to which elements in the first table. For example, attribute A in table 144 is an attribute of element 1 in table 142, and attribute D is an attribute of element 3. There are subsystem relationships that are inherent in the data structure of FIG. 9, but not specifically identified. For example, element 4 "UNIX file system" is actually an attribute of UNIX server element 1 in table 141, and is defined at entry A in table 144.

Every system may have systems and subsystems. A containment table 138, an example of which is shown in FIG. 10, defines which elements are sub-elements or subsystems of other elements. Row 1 shows that the UNIX server, element 1 in table 141, FIG. 9, has as a first subsystem or child element, the UNIX file system listed as attribute A in table 144 of FIG. 9 and element 4 in table 141. The UNIX file system itself is listed as an element in table 141 because it has attributes mapped to it by rows 6-9 of the mapping table 146 of FIG. 9. Specifically, the UNIX file system has as attributes the partition size, type of file system, and the partition name attributes defined at entries F, G and H in table 144. Row 2 of the containment table shows that UNIX file server element also has another subsystem which is the UNIX maintenance agreement defined at element entry 3 in table 141. The UNIX maintenance agreement has defined attributes D and E of table 144, i.e., the termination date and monthly cost. Row 3 encodes the parent-child relationship between the UNIX file system and a file type 1 element. Row 4 of the containment table encodes the grandparent-grandchild relationship between the UNIX file server and the file type 1 element.

A correlation table 140 stores the attribute data that allows a user to see the relationships between different user selected attributes over time. An example of this table is shown in FIG. 11. The correlation table supports user defined visual interface "widgets" of different types such as graphs or juxtaposition views between different attributes as well as other functions. This allows the user to compare different attributes over time such as server utilization versus maintenance costs. The particular example illustrated by FIG. 11 supports a juxtaposed view widget comparing server bandwidth versus available disk space over time as compared to maximum available disk space on the server.

The correlation table is an optional element and is not part of the broadest claim appended hereto since the immediate value of the system is believed to be its ability to automatically gather attribute data, compare it to fingerprints, identify assets and automatically extract other important information management needs from documents, files and by sending messages to people who know the needed information. The correlation table and visual widgets are nice features in various species that have greater utility within the genus. Likewise, the refresh table 132 and agenda manager 130 functions in FIG. 8 are attributes of useful species within the genus but are not part of the broadest claim. This is because it is useful to be able to extract the attribute data and catalog it one time, and the ability to do it again periodically and automatically is nice to have but not essential to the most basic utility.

Returning to the consideration of FIG. 8, once all the attribute data has been stored in the collected data table 128, a comparison process compares the collected attribute data to a plurality of "fingerprints" shown generally as the data structures 150. These fingerprints combine with the element/attribute definitions stored in data structure 136 illustrated in FIG. 9, to completely define the elements, i.e., systems and subsystems, the system of FIG. 8 is able to automatically detect. The element/attribute definitions in data structure 136 define what each element is and which attributes that element has. The fingerprints shown at 150 are data structures which define rules regarding which attributes may be found for that element to be deemed to exist and logical rules to follow in case not all the attributes of an element definition are found. For example, some installs of software fail, and not all the files of a complete installation are installed. Other installations of suites of software allow custom installations where a user can install only some components or tools and not others. The fingerprints 150 contain all the rules and logic to look at the found attributes and determine if a failed installation has occurred or only a partial installation of some programs and/or tools has been selected and properly identify that asset to management. For example, if all the attributes of an Oracle database are found except for the actual executable program oracle.exe, the Oracle database fingerprint will contain one or more rules regarding how to categorize this situation. Usually the rule is that if you do not find a particular main executable file for a program, you do not have that program installed even if all its DLLs and other support files and satellite programs are found.

A rules engine process 152 uses the rules in the fingerprints and the definitions in the element/attribute data structure 136 as a filter to look at the collected attribute data in collected data table 128. If all the attributes of a particular element are found in the collected data, an entry in the element catalog data store is made indicating that the element is present. If only some of the attributes are present, the rules comparison process applies the rules in the fingerprint for that element to whatever attributes are found to determine if the element is a partial installation of only some tools or programs selected by the user or an installation failure and makes an appropriate entry in the element catalog 154.

Referring to 13, there is shown a more detailed block diagram of the preferred embodiment of the program and data structure architecture for a server capable of automated asset discovery. Although the actual computer is not shown, all the functionality within the square blocks and ovals represents programs running on the server, and the data structures within the canisters represent data stored on the server's disk array. The collected data of table 128 is stored on one or more hard disks storing a file system. In this file system, there are physical blocks of storage dedicated to each of the data structures represented by the canisters on the lowest two rows of FIG. 13. The data structures can also be distributed or stored remotely. Each canister name refers to the logical name of the data structure. Each data structure hereafter will just be referred to by its name without reference to where or how the data is stored. The correlation data 140 is the data selected from the collected data by the user by specification of a "correlation index" which supports the user defined visual widgets. The log data 160 is data the server logs to keep track of its activities. The user/group data 162 defines which users are in which groups and what privileges each user has to exercise various functionality of the system.

Figure 13:
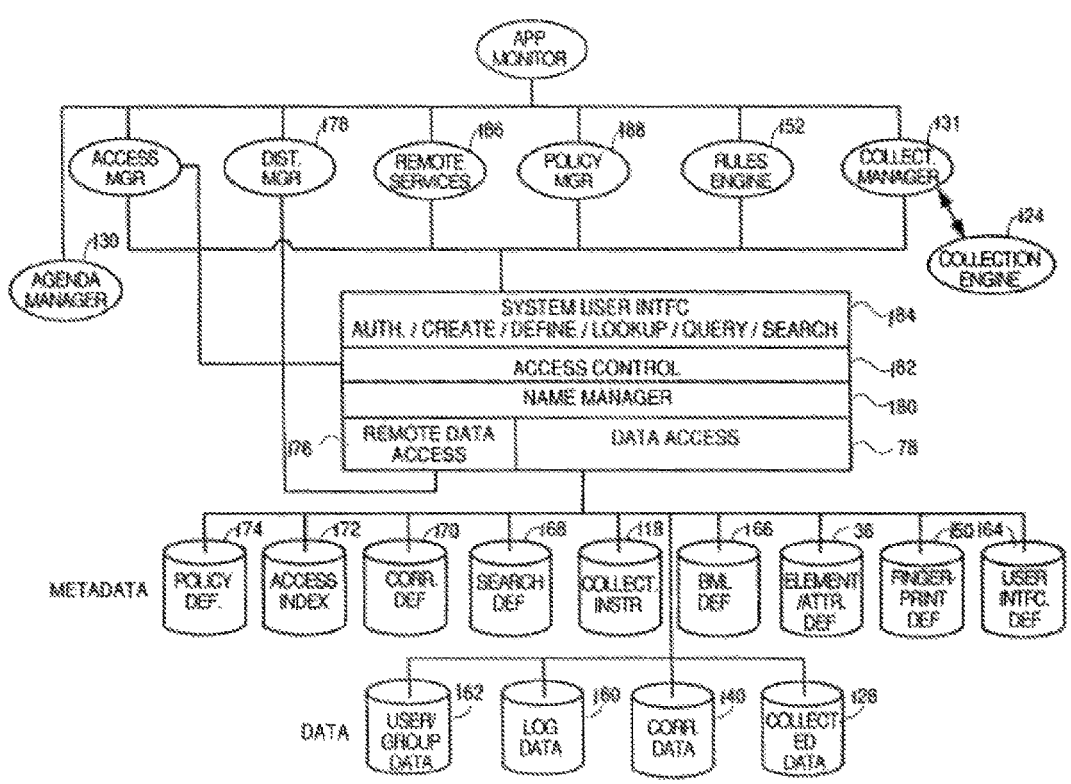
FIG. 13 is a more detailed block diagram of the preferred embodiment of the program and data structure architecture for a server which various embodiments implement.

The collection and analysis server of FIG. 13 also stores a plurality of metadata structures which give meaning to the raw data stored in data structures 128, 140, 160 and 162. A user interface data structure 164 stores data defining the pages that can be viewed via the user interface and defining the types of "widgets" that can be displayed on the user interface.

A fingerprint definitions data structure 50 contains the rules or logic used on the attribute data in collected data structure 28 to determine if all the attributes of the various elements have been found and to add the element to a catalog of elements. The data regarding which attributes each element has is stored in the elements/attributes data structure 36. The fingerprint definitions 150 also contain rules to handle situations where not all the attributes of an element are found or where an element comprises a suite of programs where the user can define which programs of the suite to install.

A BML data structure 166 stores data which defines whether a particular process is or is not running or which defines how to use the collected data in a logical, user defined sequence to determine whatever the user wants to determine. The result of a BML is another element which can be displayed as a widget.

The collection instructions data structure 118 stores sets of instructions for each attribute of each element which explains how to collect data for that element.

A search definition data structure 168 stores data that defines searches a user wants to do such as, "show me all the servers running Solaris."

A correlation definition data structure 170 stores the user defined correlation indexes which define which views the user wants to see and which elements and attributes are to be displayed using which widgets defined in data structure 164.

An access index data structure 172 stores data restricting data and views various users can see.

A policy definitions data structure 174 stores data defining policies that restrict which users can exercise certain functionalities of the system such as those that consume large amounts of server bandwidth and when they can do those things.

A remote data access function 176 cooperates with a distribution manager function 78 to integrate two or more servers like those shown in FIG. 6 so that they operate like one server to the user. In other words, if one of the servers gathers and stores certain attribute data and the other server gathers and stores certain other attribute data, then when a user exercises some function on one server that needs data from the other server, functions 176 and 178 cooperate to go across the network to the other server and get the needed data so that the function can be performed.

Data access function 178 provides the functionality to retrieve any needed metadata or attribute data or other data stored in data structures 128, 140, 160 and 162.

A name manager function 180 creates and manages mappings between names given to data by users and the actual data to which the name pertains.

An access control function 182 uses the users and groups privilege data and the policy definition data to block unauthorized users from using the system and block authorized users from exercising functionality they have no privileges to use and implement any bandwidth protection policies.

A system interface function 184 provides the basic functionality by which client applications operate the system. This program provides the necessary functionality to: authenticate users at log-on; allow users to create new elements and define BML definitions and define new widgets; lookup definitions of attributes and collection instructions and alter them; query the system to find and show the values of specified attribute data; and provide a search template that allows the user to define what she is looking for by search keys and then decomposes the data in the search template into one or more queries.

A remote services function 186 allows an authorized client applications to exercise the functionality of the collection and analysis server from remote locations anywhere on the network.

A policy manager function 188 provides the functionality to control the server to implement the policies defined by the policy definitions data structure.

A rules engine 152 provides the functionality to control the server to automatically determine which elements are present in the business organization. Specifically, the rules engine uses the rules defined in the fingerprints and the element/attribute data structure definitions to analyze the collected attribute data in data structure 128 to determine which elements are present in the system and what partial installations or failed installations exist in the system and catalog them.

An agenda manager 130 provides the functionality to determine when attribute data collection requests to collect data from data sources need to be made. This is done by consulting a refresh table which (not shown but represented by block 132 in FIG. 8) determines the intervals at which each attribute is collected, and by consulting a collection calendar (not shown but represented by block 133 in FIG. 8) which contains data defining the dates on which various attributes are collected. When such a collection action is needed, the agenda manager places collection tasks in the task queue 134 in FIG. 8. In the preferred embodiment, collection tasks get placed in the task queue automatically in accordance with a schedule in refresh table 132 and the collection calendar. Refresh may also take place as the result of a user action. The collection manager 131 continuously or periodically scans the task queue 134 in FIG. 8, and when it finds that a task is present, locates an available collection engine 124 and the correct collection infrastructure (120-122 in FIG. 8) for the attribute to be collected and causes the collection engine to execute the collection instruction to gather the attribute data and put it into the collected data store 128.

FIGS. 14 through 21 are examples of the core data structures which enable the system to run. Although not all data types and fingerprints and collectors are defined in FIGS. 14-21 for a typical system, FIGS. 14-21 are good examples of the core concepts. FIGS. 14-21 include: the definitions of very important elements or data types in every system; fingerprints for these important data types; examples of data collection instructions for various attributes; examples of actual data collected for these elements; examples of fingerprint rules used to evaluate collected data to determine if an element is present or not present; the relationships between these data elements and their attributes; and examples of parent-child element containment relationships for these type elements. These data structures are believed to be unique standing alone.

Figure 22:
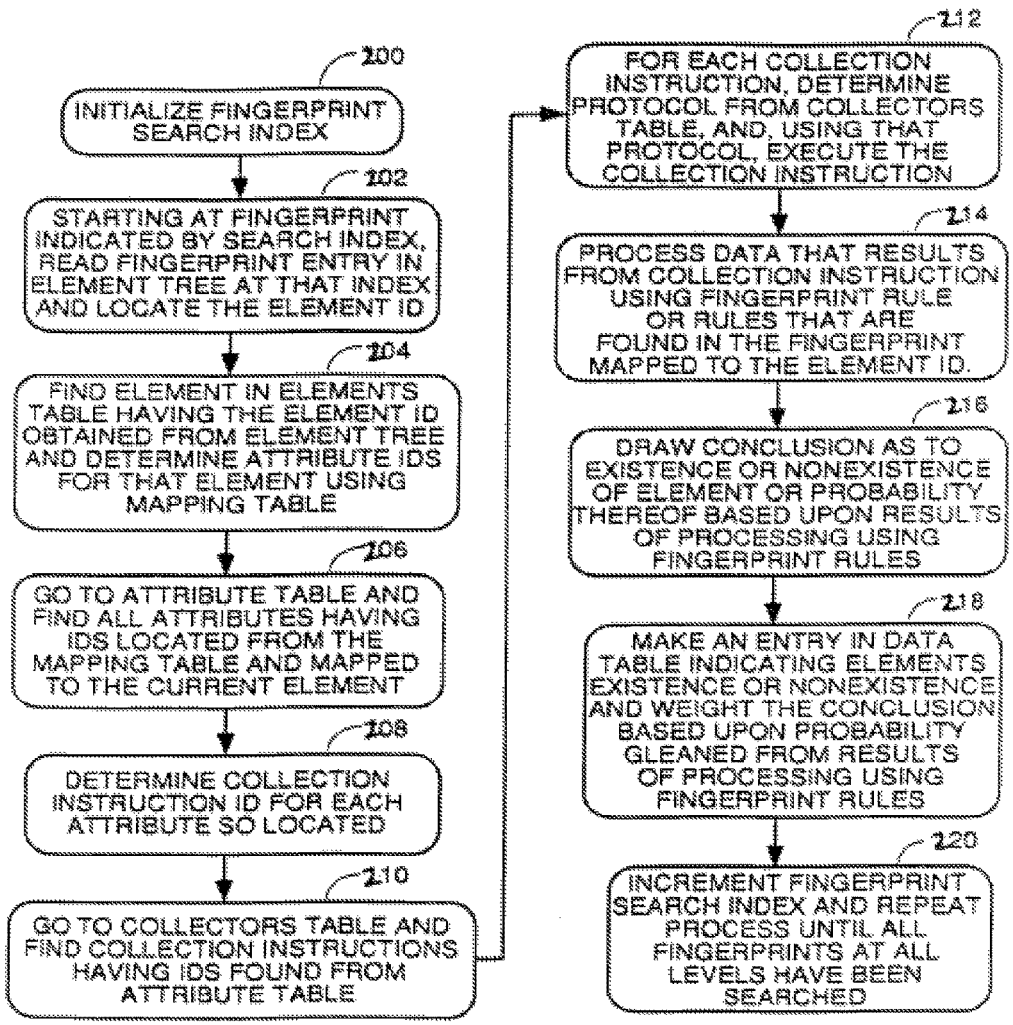
FIG. 22 is a flowchart of a process to use fingerprints to automatically collect data and categorize assets.

FIG. 22 is an example of a discovery process within the genus of processes to use the fingerprints and collection instructions defined in the data structures of FIGS. 14-21 to automatically gather data from entities in a business organization. The process of FIG. 22 also determines which of the elements defined in the data structures the organization has or does not have and/or the probabilities that the organization does or does not have each element. The data structures of FIGS. 14-21 define what the system expects to see or, more precisely, is capable of seeing using the process of FIG. 22 working with the data structures. The data structures of FIGS. 14-21 will be discussed jointly in conjunction with the discussion of the process of FIG. 22 to illustrate how the process invention uses the data structure invention.

Referring to FIG. 22, step 200 initializes a fingerprint search index which is used to keep track of which fingerprint is currently being processed. Referring to the element tree data structure of FIG. 14, there is a top section called Types, starting at line 201, which defines all the different types of elements the system can recognize. The defined types are shared in that every instance of collected data for a particular type element will have the same attributes as defined in the type section. The numbers in parenthesis next to each element type is the element ID.

There is a fingerprint section starting at line 203 which defines the various fingerprints that exist in the system and defines the types of elements the system can recognize from collected attribute data. There is also a section 205 which defines the data format for each item of data representing an instance of an attribute and which also stores the instances of the attributes.

Each line below the types line 201 and above the fingerprint line 203, represents a different type element the system can gather data about and automatically recognize from the data. The element tree defines the structure of the data in the system. The indentation relationships in the element tree type section reflects the parent-child inheritance relationships between element types. For example, the file type element, ID=5, on line 221 has name and size attributes. The UNIX type on line 223 is a type of file element that inherits the attributes name and size of its parent type File element on line 221. The UNIX file type therefore has inherited attributes name and size and also has its own attribute "owner", and has an element ID of 10,5 indicating it has inherited attributes from element ID 5. The syntax and semantics of each entry in the element tree is shown at line 225 just below the title.

The indentations in the fingerprint section define the logical relationships in the discovery process of FIG. 22 which is followed to collect the data when starting from a completely unknown network configuration and identify which elements are and are not present. For example, the first fingerprint that will be used is at line 207 and determines if a network is present. The network element fingerprint shows four attributes: the network ID, a mask value, a bottom IP address and a top IP address. This type of discovery process is different than the prior art because it starts from a completely unknown configuration and automatically discovers everything it needs using fingerprints to define attributes and collection processes to collect the values of those attributes and fingerprint rules to examine the collected data to determine if the element is there, partially there or not there.

In the prior art of monitoring systems, it was necessary to choose a monitoring system, identify a particular server to the monitoring system, tell the monitoring system what type of operating system the server was running and then install an agent on the server and/or every desktop in the LAN. The agent then went out and discovered what type of network cards were installed, what processes were running etc. and reported back to the monitoring system. Thus, each time the monitoring system or agent software is modified, the agents had to be reinstalled on every server and desktop which is time consuming and expensive. The process of FIG. 22 and the data structures of FIGS. 14-21 are the enabling technologies that allow an entire business organizations assets to be found and catalogued without the huge overhead of installed agents and the labor of predefining to the monitoring system all the servers, desktops and operating systems on the LAN or LANs of the organization.

If a network is found, then the next step would be to determine all the network interface cards that are coupled to the network using the NIC fingerprint at line 209. The NICs are all coupled to computers, so the next question is what types of operating systems are running on those computers. The Solaris 2.7 fingerprint on line 211 is one type of fingerprint that can be used to determine if any of the computers are running this operating system. Other fingerprints not shown would usually be present for Windows NT, Windows 98, etc.

Typically, under each operating system fingerprint, there would be hundreds of other fingerprints defining many types of elements such as application program packages the attributes of which can be collected by invoking the proper function calls of the operating system.

Once the type of operating system on a particular computer has been determined, the next thing the system would like to know is whether it is a web server. The HTTP fingerprint on line 213 is used to determine if the server is running a web server process.

The next question of interest to the system is who is the superuser of the computer just located. That is the purpose of the fingerprint at line 215. Typically, the collection instruction in this type fingerprint will cause the system to send out an e-mail to an administrative person who knows the name of the superuser with a request to send back an e-mail, although other means for collecting this data attribute may be encoded in the fingerprint. Next, the amount of memory needs to be known, and that is the purpose of the fingerprint at line 217. The CPU type is of interest next, and that is the purpose of the fingerprint at line 219.

The indentations in the data section starting at line 205 just track the indentations of the fingerprint section as the order of the fingerprints is the order in which data is collected. Multiple relationships are possible between data elements.

Line 227 is the data of an instance of a network found in the hypothetical example. This network has a network ID of 1.1.1.0, a mask value of 255.255.255.0, a bottom IP address of 1.1.1.2 and a top IP address of 1.1.1.254. Line 229 represents the data of an instance of a particular NIC that has been found with an IP address of 1.1.1.20 and a response attribute of 25 milliseconds.

Step 200 in FIG. 22 starts the automated data collection process by setting the search index pointer at line 207 in FIG. 14. Step 202 is the process of reading the fingerprint entry in the element tree at the location of the pointer (line 207 on this first pass through the loop) and determining the element ID to which this fingerprint pertains. In this case, the element ID is 101. Reference to the elements table of FIG. 8 shows that there is no type ID or collector ID for this element per se. In step 204, this element ID is used as a search key to search a mapping table to determine which attributes that element has. The mapping table is shown in FIG. 17A. The element ID 101 for the network element is mapped to attribute IDs 68, 69, 70 and 71.

Step 206 represents the process of using each of the attribute IDs located in step 204 as search keys in the attribute table of FIG. 16. In the example, all the attribute IDs 68, 69, 70 and 71 which are mapped to element ID 101 are located in the table of FIG. 16.

Step 208 represents performing the step of determining the collection instruction ID for each attribute mapped to the fingerprint and element currently being processed. One or more attributes can be collected through a single collection instruction. In alternative embodiments, the attributes will be obtained one at a time during each pass through the loop and the collection instruction ID for only one attribute will be found and executed on each pass through the loop and there will be a test at the end of the loop to determine if all collection instructions for all attributes mapped to the current fingerprint have been executed. This can be an inner loop within an outer loop with the outer loop processing one fingerprint per pass through the loop and the inner loop iterating as many times as there are attributes. When all the attributes have had their collection instructions processed in this alternative embodiment, the fingerprint rules are applied to the collected data and an appropriate entry is made in the data table regarding the existence, degree or probability of existence, or nonexistence of the element. Then the fingerprint search index pointer is moved to the next fingerprint to be processed and the processing starts again for the next fingerprint. In the embodiment of FIG. 22, all the attributes are determined in step 206 and all their collection instruction IDs are determined in step 208. The collection instruction IDs (COLLECTORID) are determined by using the element ID as a' search key in the elements table of FIGS. 17A and 17B and looking up the COLLECTORID in column 3 mapped to each attribute mapped to the element ID. In the example, these collector IDs are 208, 209, 210 and 211.

Figures 18, 19, 20:
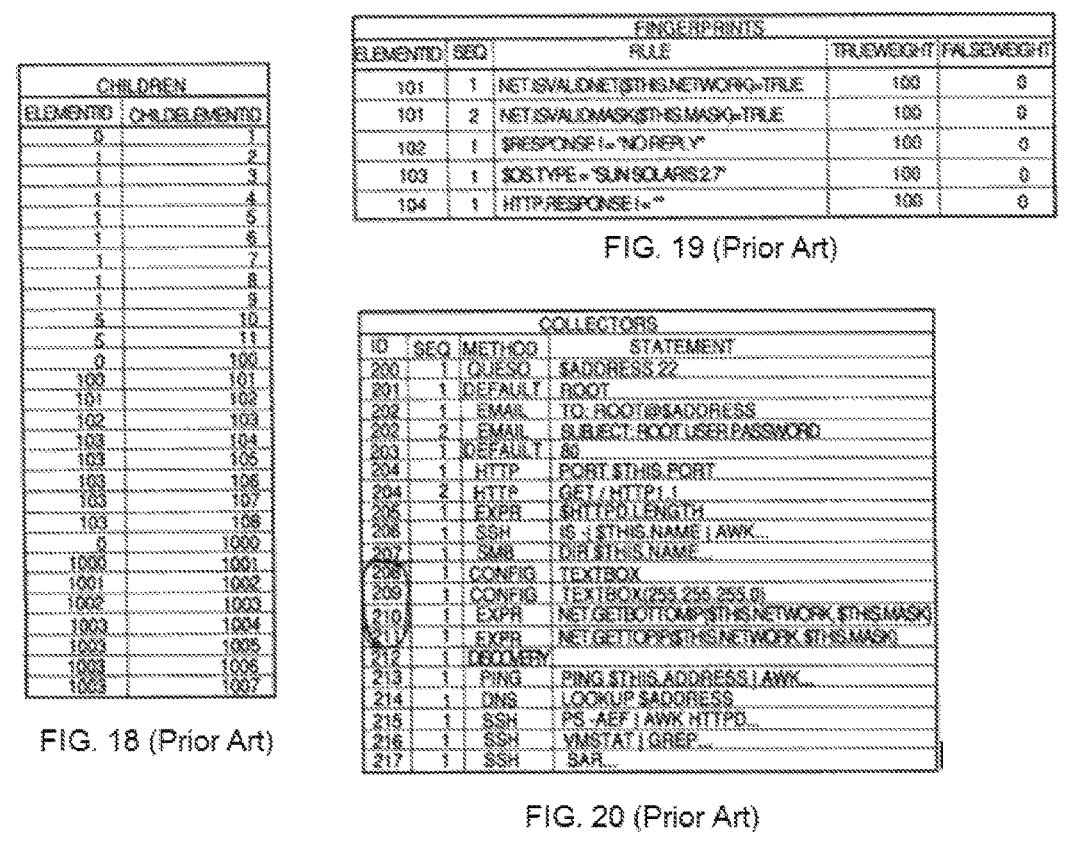

In step 210, the system goes to the collectors table of FIG. 20 and uses the collector IDs determined in step 208 to search for and find the collection instruction for each attribute mapped to the element and fingerprint currently being processed. Those collection instructions are circled in FIG. 20, and the collection instruction itself is in the Statement column. The protocol to use is identified in the Method column.

Step 212 is the process of determining the protocol to use for each collection instruction for each attribute mapped to the fingerprint for the element currently being processed. This is done simply by reading the entry in the Method column for each of the collector IDs mapped to the element ID currently being processed. More than one method or protocol may be used in a single fingerprint to perform system identification by multiple means. Step 212 also represents the process of accessing the protocol library identified in the Method column and using the appropriate protocol from that library to execute the command or operation specified in the Statement column.

Step 214 is the process of applying the fingerprint logical rule or rules to the attribute data collected in step 212 for the element currently being processed to draw a conclusion regarding the probability of existence or nonexistence of the element whose fingerprint is currently being processed. This is done by using the element ID as a search key to search the fingerprints table of FIG. 19. In the example, element ID maps to two different rules defined in the Rule column. The seq column defines the sequence in which these rules are to be applied to the collected data. In the example, the first rule invokes a function call of an application programmatic interface to run a program to examine the collected network ID attribute data and determine if that is a valid network ID. If the network ID is valid, a true result is returned. The Trueweight and Falseweight columns give weighting factors to use if the result of application of the rule is true or false, respectively. Step 216 represents the process of drawing conclusions regarding the existence or nonexistence, or probability thereof, of the element to which the fingerprint currently being processed pertains.

In step 218, an entry for the element mapped to the fingerprint currently being processed is made in the data table of FIG. 21. Referring to FIG. 14, line 227, the attribute data for an instance of a network having element ID 101 is shown. This data instance has its own ID which is 1001. In FIG. 21, the values for each of the attributes of the fingerprint mapped to network element ID 101 are shown on data instance ID 1001 in the first column (this column is labeled Elementid, but, more precisely, should be labeled data instance ID). The second column indicates this attribute data was collected at a time corresponding to timestamp 40. The actual values for the four attributes of the network element specified in the fingerprint are shown in columns 3 through 6 with the column Attr1 containing the network ID, column Attr2 containing the mask value for this network.

Step 220 increments the fingerprint search pointer index to point at the next fingerprint to be processed. In the example, the next fingerprint to be processed would be on line 209 of FIG. 14. In alternative embodiments, before each fingerprint is used to collect attribute data and analyze it, configuration data is checked to make sure the fingerprint is "turned on", i.e., the system administrator wants new attribute data gathered about the element that corresponds to the fingerprint. In the claims, fingerprints that are "turned on" are referred to as "active". This functionality allows the system administrator to block gathering of attribute data about some or all elements. This can be done at every level of the hierarchical organization of fingerprints shown in FIG. 14 so that entire levels are blocked off or just some elements on certain levels are blocked off. In still other alternative embodiments, configuration data is used to turn fingerprints on or off and refresh schedule data is used to determine how often to collect the attribute data for each element. Each element can have its own refresh schedule. In this alternative embodiment, step 220 in FIG. 22 represents the process of picking another fingerprint which configuration data indicates is turned on and which the refresh schedule data indicates is ripe for another discovery effort. Thus, the process of FIG. 22 would be repeated until every "active" fingerprint which was ripe for processing had been processed.

The process described above to automatically gather attribute data and analyze it using fingerprint rules to determine the existence of the element is then repeated. In the example, the next fingerprint is on line 209 and is for a network interface card. In gathering the attribute data for this type of element, the system would cycle through all the valid IP addresses of the network just found from processing the network fingerprint(s) and send out a packet to each address ("ping") to determine if a response was received. Each NIC which responds represents a device coupled to the network. Then, for each NIC that responds, the BDNA automatic asset inventory system wants to know the type of operating system the device is running and information about whether the device is a web server, has a superuser and who that is, its memory size and CPU type, etc. To gather that information, each of the fingerprints on lines 211, 213, 215, 217, 219 and 231 of FIG. 14 is processed as described in FIG. 22 for each NIC that responds. That is the meaning of the indentation of lines 211, 213, 215, 217, 219 and 231 under the NIC fingerprint on line 209.

Figure 23A:
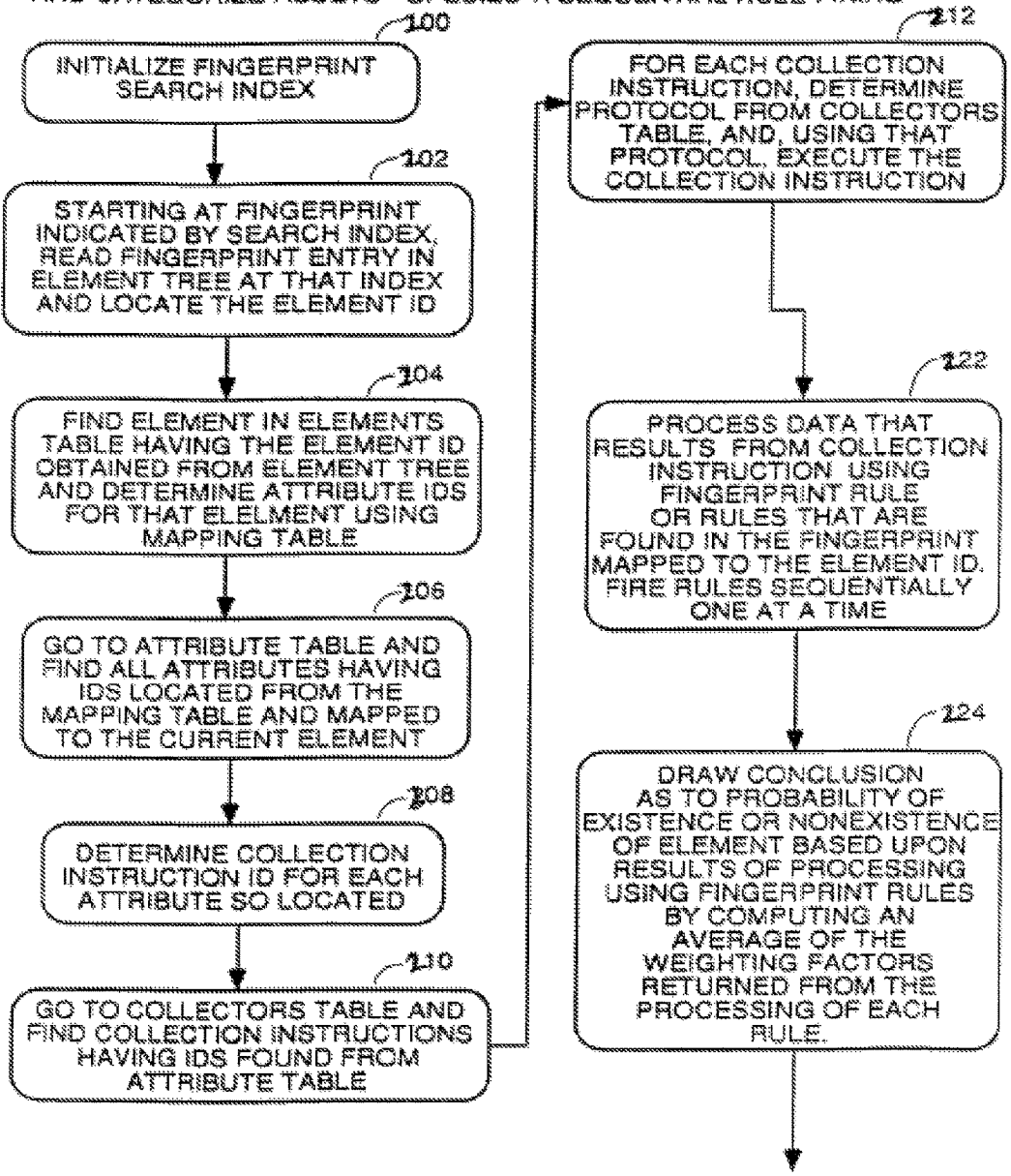
FIGS. 23A through 23B are a flowchart of a process to use fingerprints to automatically collect data using a sequential rule firing algorithm.
Figure 23B:
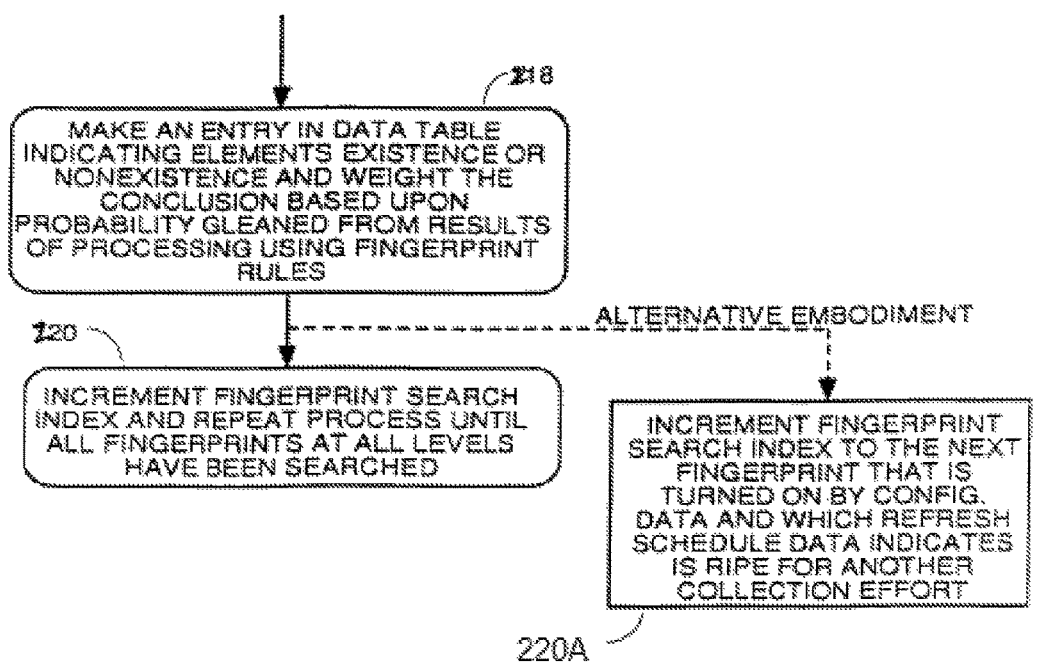

There are three different species or alternative embodiments regarding how fingerprint rules which are represented by the generic steps 214 and 216 can be used. The first is represented by the flowchart of FIGS. 23A and 23B. In this first alternative species, the one or more rules of the fingerprint are simply applied to the collected data sequentially, one at a time in step 222. A conclusion is then drawn as to the probability of the existence or nonexistence of the element by computing a running average of the weighting factors returned by application of each rule in step 224. The final weight computed from the averaging process is entered in the data table in a column not shown in step 218 on FIG. 23B. All steps in FIGS. 23A and 23B having the same reference number as steps in FIG. 22 represent the same processing as they did in FIG. 22. The alternative species using configuration data to turn fingerprints on and off and refresh schedule data to control the interval between collection attempts of any fingerprints that are turned on is indicated by step 220A.

A weight of 100 means the element is definitely present. A final weight of 0 means the element is definitely not present. Any weight between these two extremes means there is some uncertainty as to the existence of the element or there was, for example, a partial installation in the case of a software application.

Figure 24A:
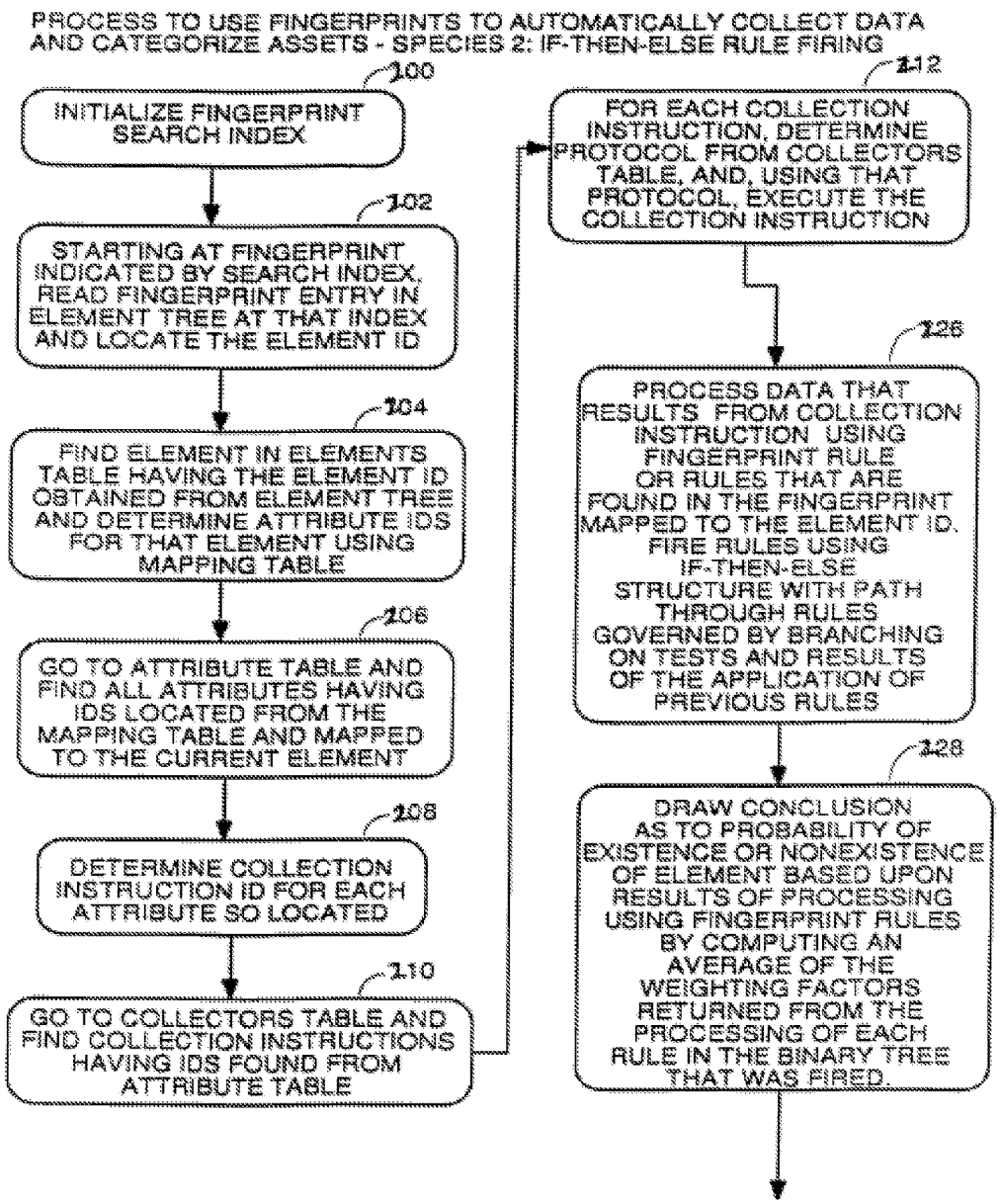
FIGS. 24A through 24B are a process to use fingerprints to automatically collect data using an if-then-else rule firing algorithm.
Figure 24B:
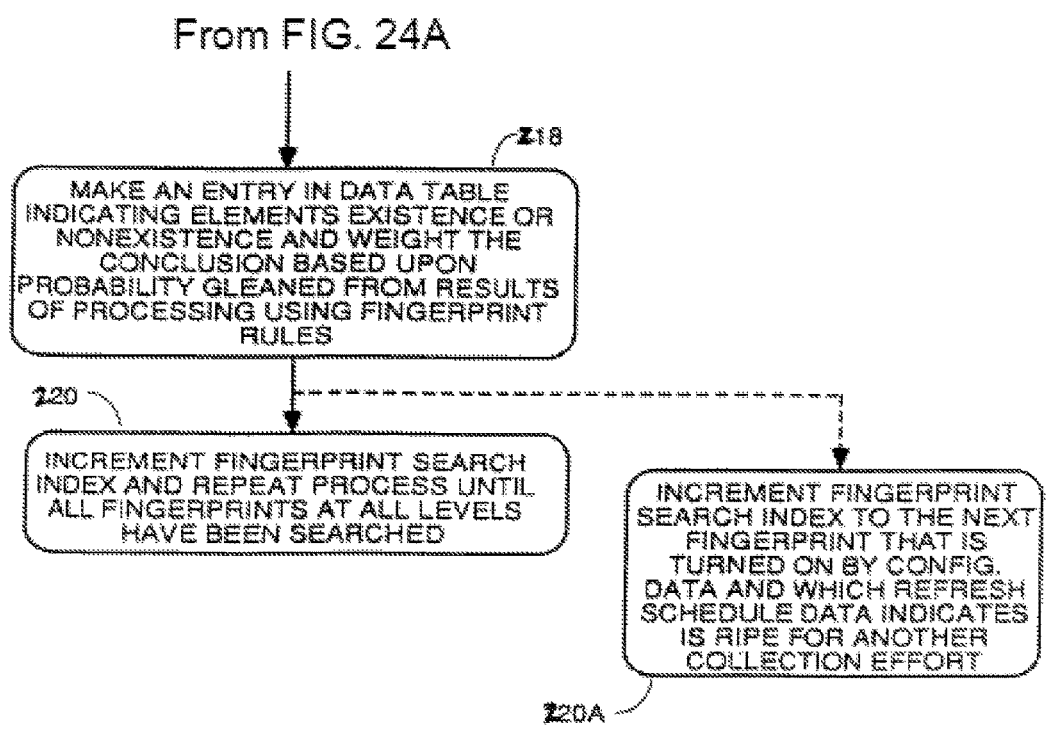

A second species represented by generic steps 214 and 216 in FIG. 22 is represented by the flowchart of FIGS. 24A and 24B. In this species, the fingerprint rules are fired in an IF-THEN-ELSE logical fashion in step 226. This means that if an element has multiple rules, the first rule will be applied to the collected attribute data, and then branching to either of two other rules will occur depending upon the results of application of the first rule to the gathered attribute data thereby defining a binary tree structure. The binary tree can have multiple levels. This selective branching based upon result can occur at every level of the tree. Step 228 represents the process of drawing a conclusion as to the probability of the existence or nonexistence of the element by computing an average of the weighting factors returned by whatever fingerprint rules in the binary tree that were fired. All other steps in the process are the same as in FIG. 22. The alternative species using configuration data to turn fingerprints on and off and refresh schedule data to control the interval between collection attempts of any fingerprints that are turned on is indicated by step 220A.

Figure 25A:
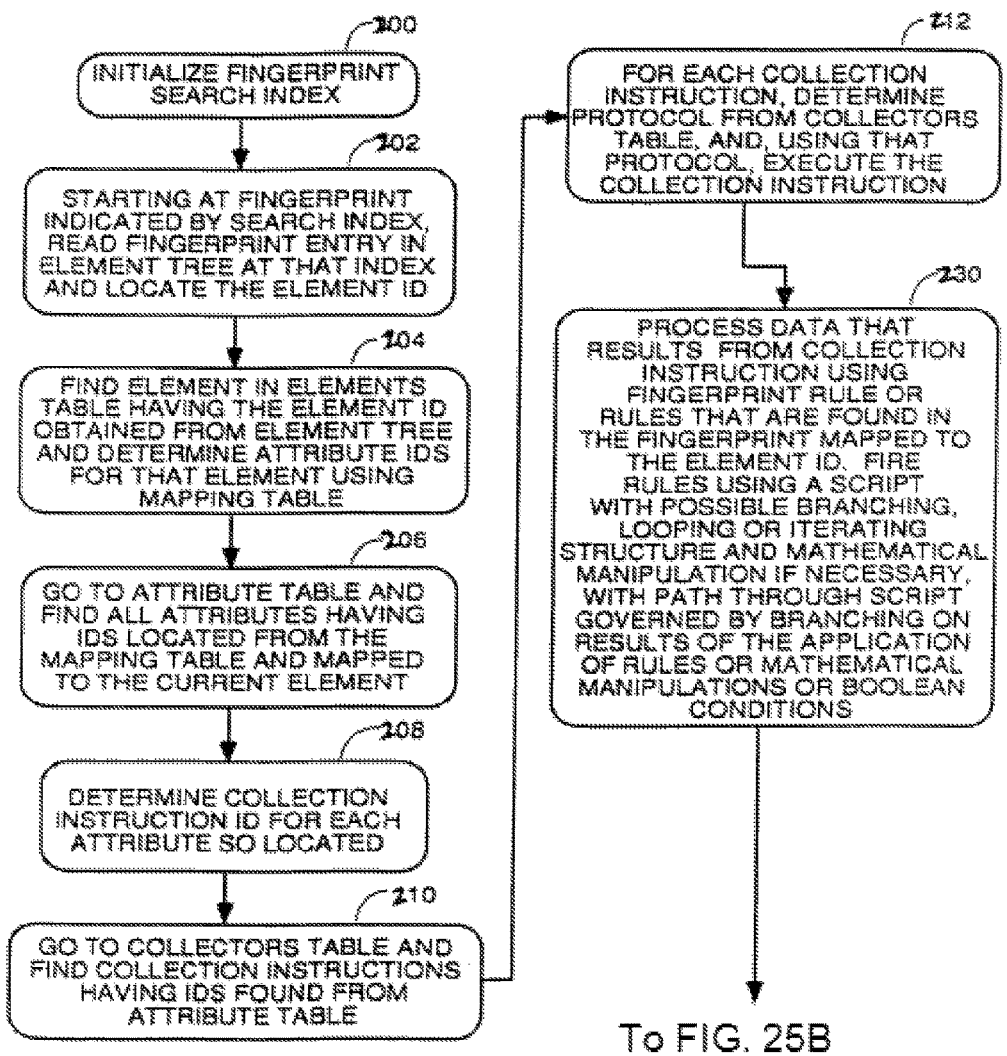
FIGS. 25A through 25B are a flowchart of a process to automatically collect data and categorize assets by firing rules and processing according to a script.
Figure 25B:
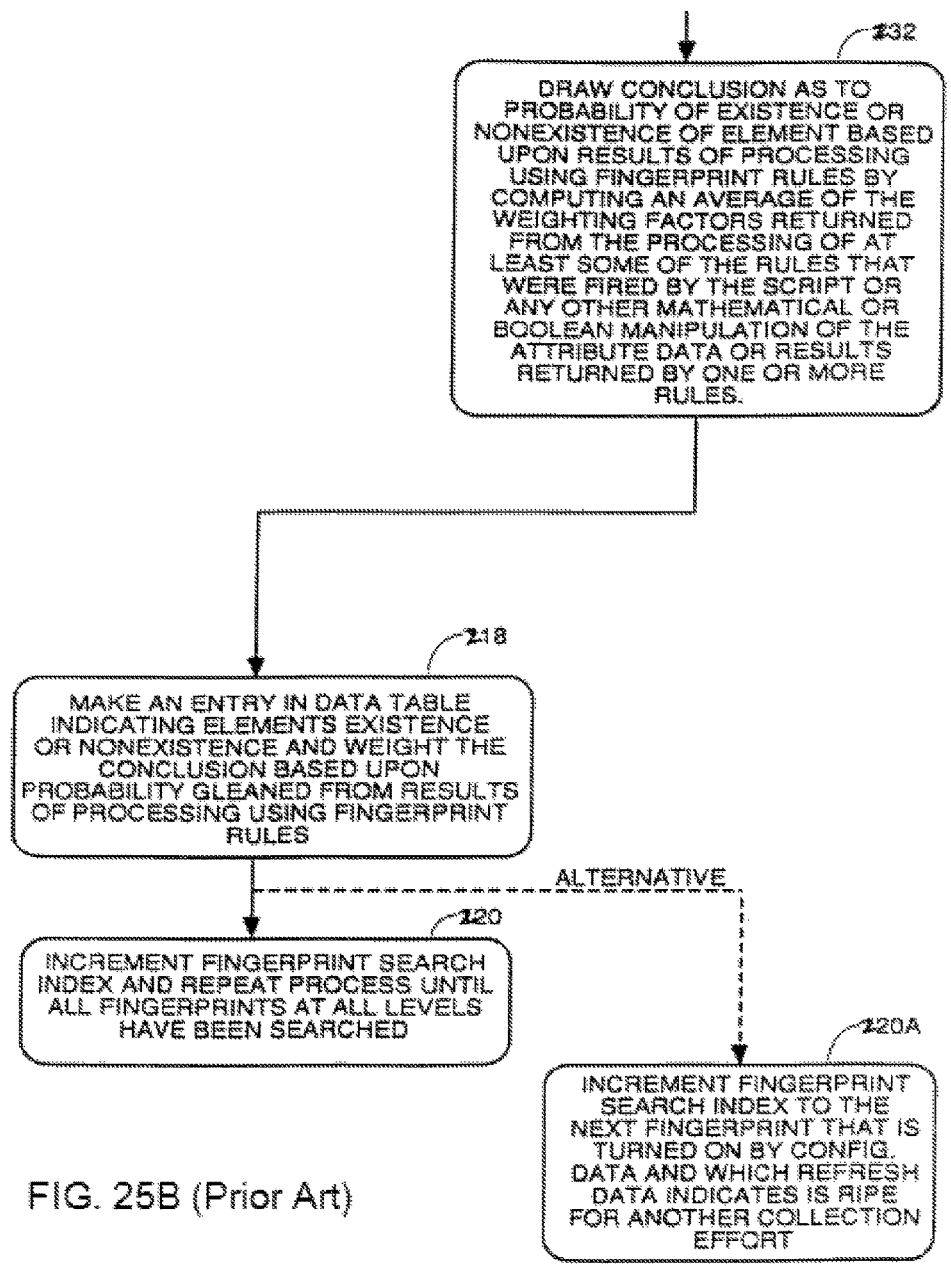

A third species represented by the generic steps 214 and 216 of FIG. 22 is represented by the flowchart of FIGS. 25A and 25B. This species uses a script such as a scripting language, initially Perl, to control the application of fingerprint rules to gathered attribute data, as represented by step 1. In this species, a script controls which rules are fired with branching or selection of the rules to be fired based upon the results of processing of other rules or mathematical manipulations of attribute data or mathematical manipulation of the results returned from the application of other fingerprint rules or upon Boolean conditions found in the attribute data or returned by the processing of other rules. The script can have looping, iteration, subroutines or any other known programming device and can any program structure and use any programming techniques required by the situation. Step 232 represents the process of drawing conclusions as to the probability of existence or nonexistence of a particular element. This can be done by computing an average of the weighting factors returned from the processing of at least some of the rules that were fired (or all of them) or by any other mathematical or Boolean manipulation of the attribute data and/or the results returned by application of one or more fingerprint rules. All other steps are the same as in FIG. 22. The alternative species using configuration data to turn fingerprints on and off and refresh schedule data to control the interval between collection attempts of any fingerprints that are turned on is indicated by step 220A.

Figure 26A:
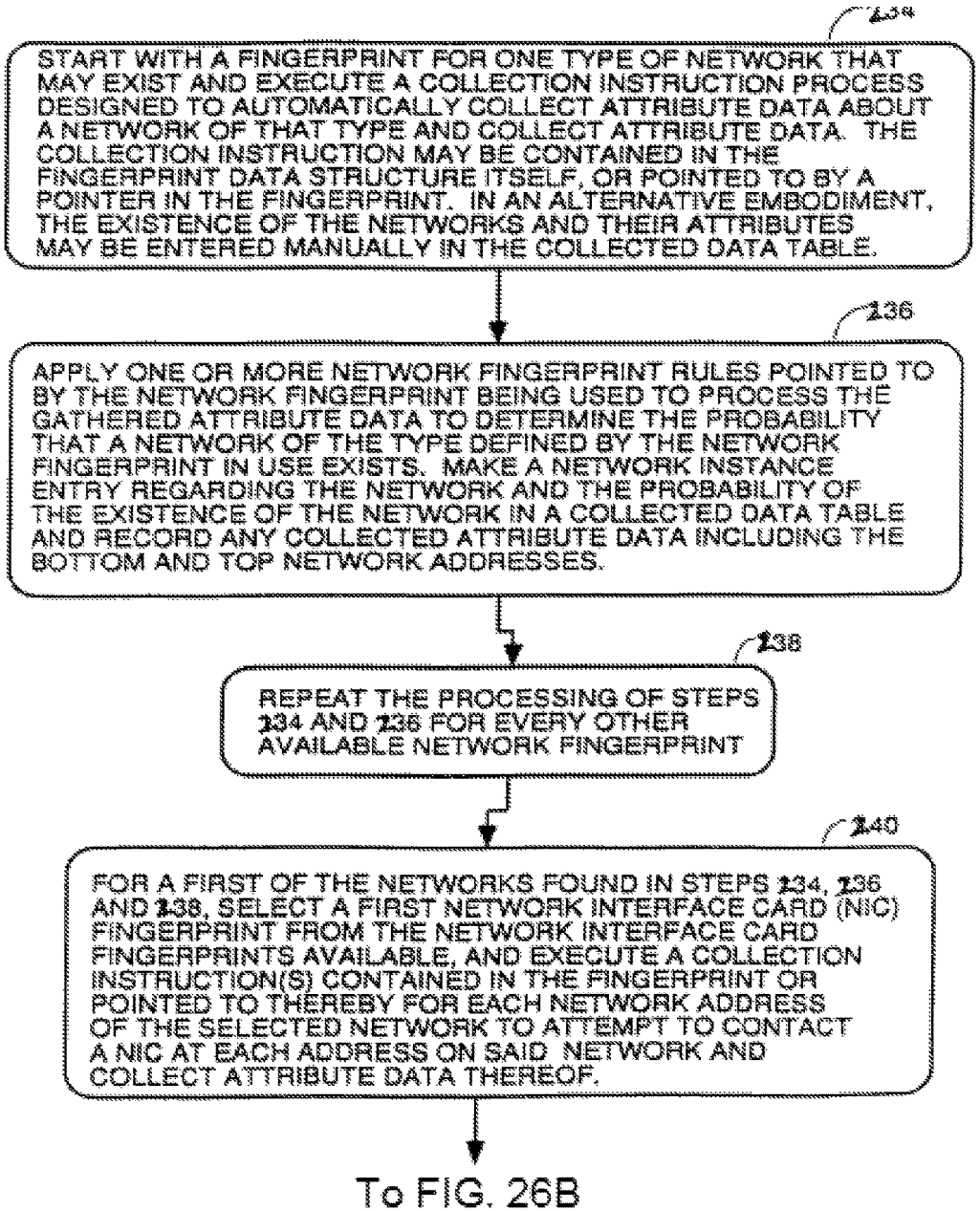
FIGS. 26A through 26C are a flowchart of a process to discover the assets in a system or designated portion of a system starting with no knowledge of the existence of any networks, servers or the operating systems thereof.
Figure 26B:
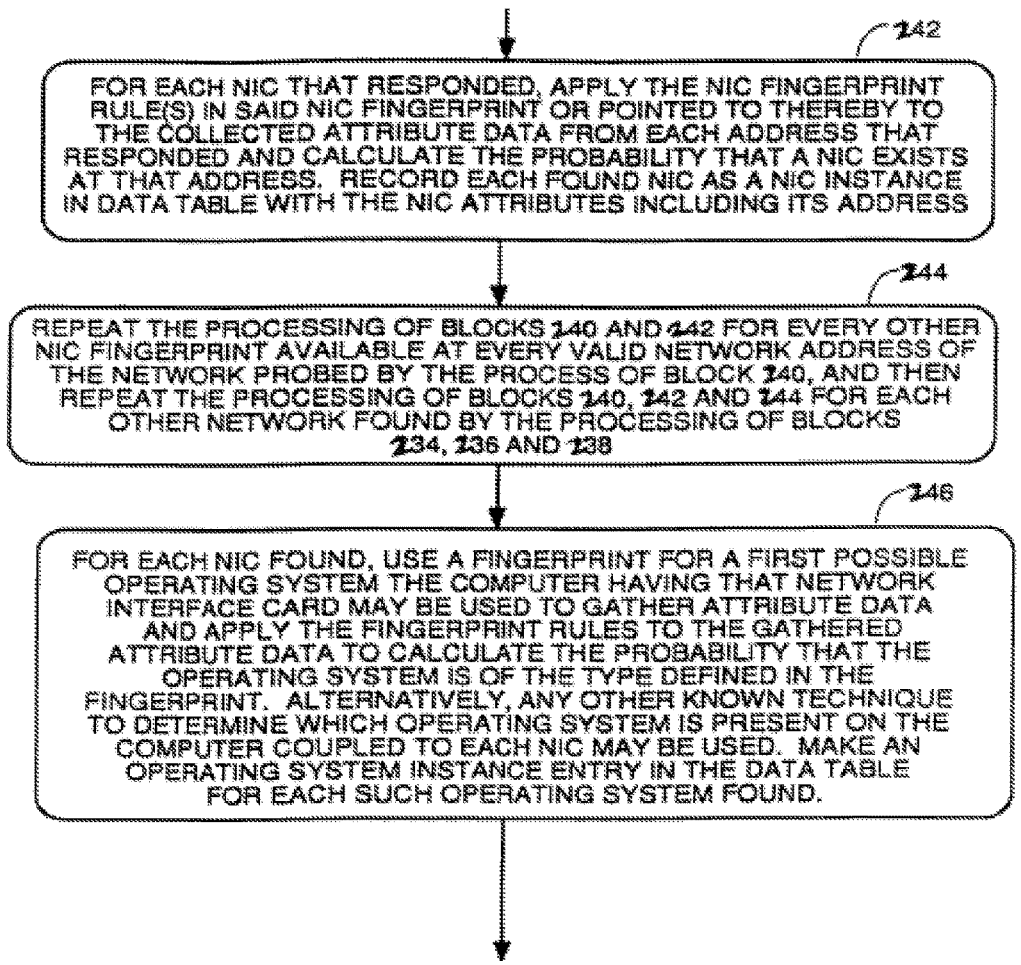
Figure 26C:
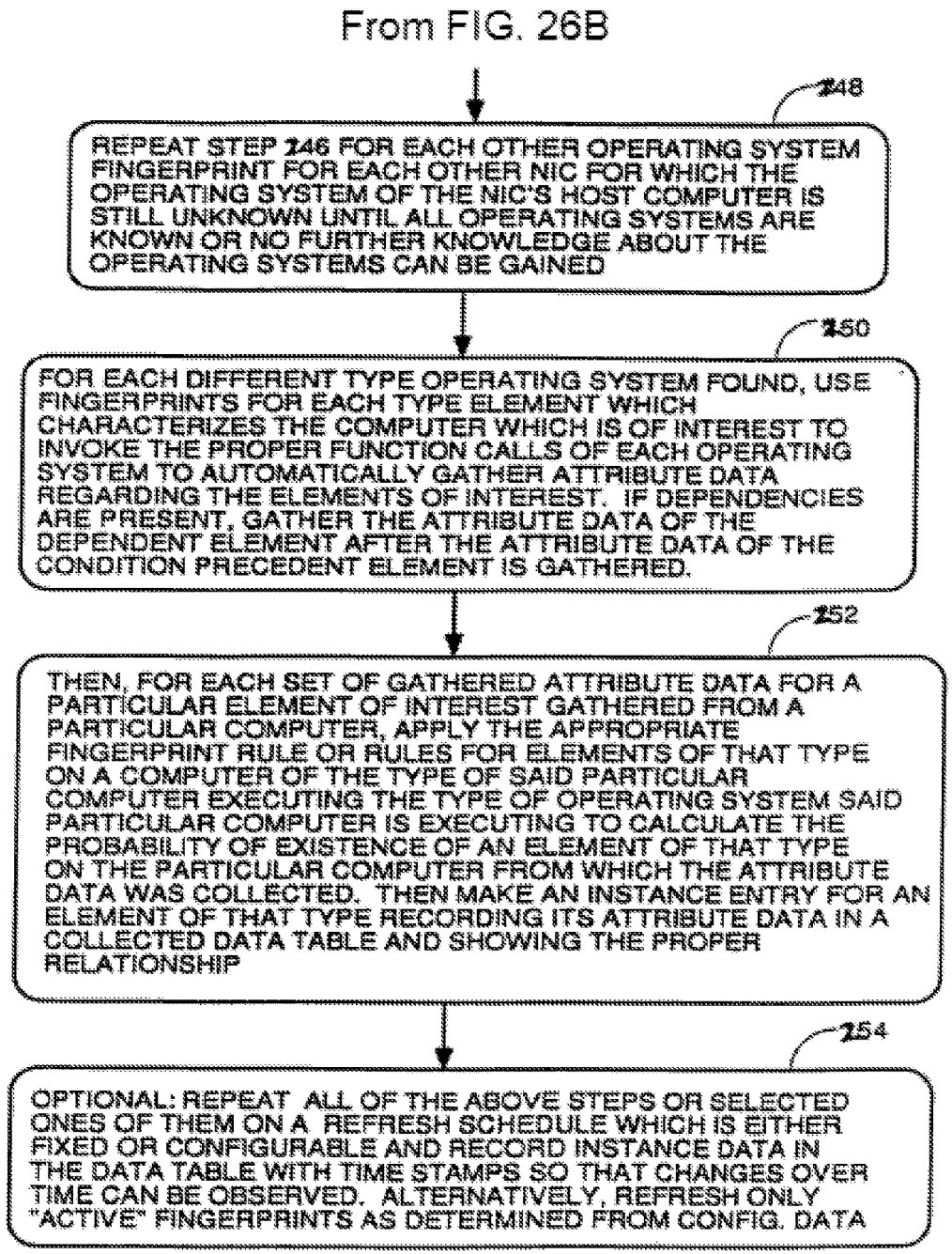

Referring to FIGS. 26A, 26B and 26C, there is shown an overview process diagram of an automated discovery process which allows the system of the invention to automatically discover and characterize the computer and software assets of a company or designated subset of computer and software assets without any prior knowledge of the networks or servers in a company. The process of FIGS. 26A, 26B and 26C, uses fingerprints in a particular logical order selected to allow the assets of the company to be discovered without any pre knowledge about what or where those assets are. This allows automatic discovery of the existence of networks, which network addresses have network interface cards mapped thereto, the operating systems the computers having those network interface cards are executing and many different things that characterize each of the computers. Those things include, but are not limited to, the installed software, which software processes are in execution, CPU type, speed, memory, file system, etc.

FIGS. 26A, 26B and 26C represent the details of how to use fingerprints in a particular order to determine the assets in an organization, but the basic steps that define the genus of this automated discovery process are as follows. First, use one or more network fingerprints to determine the existence of one or more networks and gather data about them to determine the type and attributes of any discovered network and make an entry in the element and data tables. Second, using the valid addresses of each discovered network and one or more network interface card fingerprints, the system probes the discovered networks to discover all the network interface cards that exist on each discovered network and the attributes of each. Third, for each network interface card found, one or more fingerprints for the operating systems the process is capable of detecting are used to determine the operating system that is controlling each computer coupled to one of the found networks by one of the found network interface cards. An entry for each found operating system is then made in the element and data tables that record the type of operating system and its attributes. Fourth, for each found operating system, one or more fingerprints is used which define the attributes of one or more elements of interest and rules to process gathered attribute data to determine if an element exists and what it is. These fingerprints are used to gather attribute information about each element of interest via said operating system. Typically, this is done by invoking function calls of the operating system which, when executed, supply information about the existence and attributes of said one or more elements of interest. When the attribute data is gathered, an entry in a data table is made regarding each found element.

Turning to the exact details of the automated discovery process shown in FIGS. 26A, 26B and 26C, step 234 represents the step of starting with a fingerprints for one of the one or more different types of networks and executing collection instructions. These collection instructions are either in the network fingerprint or are found by following a pointer in the fingerprint to the collection instruction. The collection instruction automatically collects attribute data or at least attempts to do so. Sometimes the network will not respond to the collection attempts orchestrated by the fingerprint. That happens when the network fingerprint selected does not match the actual network in existence. This can happen when the type of network installed is unknown in the fully automatic process and a fingerprint is chosen at random from among all the network fingerprints available. In this case, the absence of attribute data will be recorded.

In the preferred embodiment, step 234 is accomplished by starting with one fingerprint for a potential network of a certain type and following a pointer in the network fingerprint to a collection instruction to gather attribute data for that type of network. The fingerprints corresponding to each element ID are stored in the table of FIG. 19. The collection instruction for each fingerprint is stored in the table of FIG. 20. The table of FIGS. 17A and 17B maps each element ID to the ID of a collector instruction and to the fingerprint for the element. Step 234 represents executing that collection instruction and gathering attribute data if possible.

In alternative embodiments, the existence of the networks and their attributes may be entered by hand in the collected data table since it is easy to do this.

In step 236, the rules in the network fingerprint used in step 234 are applied to the gathered attribute data, if any, to determine whether a network of the type defined by the network fingerprint exists. If so, the found network is recorded as a network instance in the elements table such as are illustrated in FIG. 12 or FIG. 21. The attributes of the found network including its top and bottom IP addresses are recorded in the collected data table. This has the effect of creating a map in the elements table of the networks that exist.

In step 238, the process of steps 234 and 236 is repeated using each of the other available network fingerprints to determine if any other networks are present, and, if so, to collect attribute data for these other networks.

For every network found, step 240 represents the process of selecting a fingerprint for one of the possible network interface cards (NICs) that may be coupled to the found network(s) to gather information about any NICs coupled to each network. This is done, on each network, by executing a collection instruction in the NIC fingerprint or pointed to by it for each of the network's valid addresses to attempt to contact a NIC at each address and gather attribute data about it. In the preferred embodiment, this is done by following a pointer in the fingerprint to the collection instruction. This phrase "following a pointer in the fingerprint to a collection instruction" or words to that effect includes using the element ID as a pointer in the fingerprint table to the fingerprint and also as a pointer to the collection instruction for that fingerprint in the collectors table of FIG. 20. The collection instruction is performed once for each valid address of each network. This constitutes an attempt to contact a NIC at that address in a language it understands.

As symbolized by step 244, this execution of a collection instruction is done at every address on the network being processed for which the NIC type is unknown using every NIC fingerprint until one of the fingerprints works or one runs out of NIC fingerprints and a conclusion can be drawn. That conclusion is that either there is no NIC at that address or it is not a type of NIC for which a fingerprint has been defined. Once a NIC has been found at a particular address, no further fingerprints need be used on that address, and processing can move to the next address until all addresses of the network have been processed. Then, as represented by step 244, all the addresses of all the other known networks are similarly processed to find the NICs assigned thereto or draw the conclusion that no NIC at all or a foreign NIC for which there is no fingerprint is assigned to certain addresses.

Once the NIC fingerprint that works, if any, is found, the collection instructions pointed to by that NIC fingerprint are used to gather attribute data about the NIC at that address. This process is repeated at each address upon which a NIC is found. In other words; as symbolized by steps 244, this attribute data collecting process is repeated at every valid address of every network to find all the NICs. The whole process can be done one network at a time or in parallel using multiple data collector processes working simultaneously.

Step 242 represents the process wherein the rule or rules in the NIC fingerprint currently being processed are applied to the gathered attribute data to calculate the probability that a NIC instance exists at the address being processed. For each found NIC, a NIC element instance with all the attributes of the NIC is recorded in the elements and collected data tables. As symbolized by step 244, the process of applying the appropriate NIC fingerprint rules to attribute data collected for each address which responds, is repeated for every address of every network until all NICs are found.

For each NIC that is found, processing represented by step 246 determines what type of operating system the device having the NIC is executing. This can be done in several known ways such as by sending a specific type of network packet to the unknown machine at the network address. This network packet has a defined or undefined response packet. Each operating system deals with arrival of such a packet differently. By examining the response packet, it is possible to determine which type of operating system the unknown machine is running.

Alternatively, the fingerprint for each different possible type of operating system and version can be used to point to a collection instruction list which controls a data collector process to attempt to invoke a particular function call of a programmatic interface (API), a service, utility, or program of the operating system. Each operating system has a different set of APIs, services, utilities and programs. If the operating system responds to the attempt to invoke a particular function call of an API for a known type of operating system, then the operating system must be of that type since all other operating systems would not respond or would respond in a different or unexpected manner. Thus, by trial and error elimination, the type of operating system can be determined using fingerprints in one of the species represented by step 146.

Once the type of operating system is determined, the proper fingerprint for that type operating system can be used to gather more attribute data that defines the operating system itself, and the appropriate operating system fingerprint rules can be applied to the gathered attribute data to calculate the probability that the operating system exists and is of the type the fingerprint being used defines, as symbolized by step 246.

Once the operating system type has been determined and its attribute data gathered, an operating system instance entry is made in the element table to indicate that device X is running operating system Y where X is the particular device host name and Y is the type of operating system, as symbolized by step 246.

Then, step 246 is repeated for every NIC that responded to determine the operating system of every computer on the network, as symbolized by step 248.

Now that the operating system is known for every device on all the networks (unless a rogue operating system or version of an operating system with no fingerprint is present), many different things of interest about each device can be determined by invoking the proper function calls of various APIS, services, utilities, or programs of the operating system. These things include but are not limited to: whether it is a web server; who its superuser is; the superuser password; how much memory it has; what type CPU it has and the speed thereof; what type of file system(s) it has and which file system is mounted; the files that are in the file system; what software packages are installed on the computer; and, which software processes are in execution at any particular time. Assuming there is a fingerprint for each of these things and there is a way to obtain this data about each device, each of these things may be determined by using a fingerprint for an element of that type.

The fingerprints for these other elements of interest can be used in any order, but sometimes there are dependencies built into the fingerprints. This means that attribute data about one element cannot be gathered until the attributes of another fingerprint have been gathered. For example, sometimes attribute data about a child element cannot be gathered until the attribute data for a parent element has been gathered. If an element has a dependency, in the preferred embodiment, this fact will cause its attributes to not be gathered if the element upon which it is dependent has not had its attributes gathered. However, in the preferred embodiment, there is a refresh table which governs the frequency at which each fingerprint is used, so if the element with the dependency has had its dependency condition satisfied the next time the fingerprint for the element is scheduled to be used, the attributes will be gathered at that time. In alternative embodiments, whenever the parent element, or whatever other element is a condition precedent to gathering the attributes of the element in question, has its attributes gathered, that will automatically trigger gathering of attributes of all other elements which are dependent upon it.

The fingerprint that is used to determine each element may be, and usually is, unique to the particular type of operating system. For example, the fingerprint to determine CPU type and CPU speed is usually different as between an IBM server running AIX and a Sun server running Solaris 2.7. This is because at least the collection instructions are different. However, collection instructions may be shared between different fingerprints for the same element to be gathered from different operating systems or different versions of the same operating system. For example, if the function call that needs to be invoked to determine the amount of memory is the same on an HP UNIX machine and a Sun Solaris 2.7 machine, the memory fingerprint collection instruction for these two different type machines can be identical.

Step 250 represents the process of running the various fingerprints for the different things about the machine that are of interest once the operating system type is known. Step 250 represents this process generically, and the different species mentioned above to handle dependencies are all symbolized by step 250. To gather attribute data, the collection instruction associated with each fingerprint is executed and attribute data is collected about each element. An entry is then made in the collected data table for each element that includes the elements attributes data and, in some embodiments, the probability or confidence level that it exists. In some embodiments, the instance entry in the element table is only made for elements where the probability or confidence level is above a certain level, which can be configurable in some embodiments. Step 252 represents this processing.

The instance entry in the element table is entered in such a way to show the relationship to any parent elements or supersystems of which the element is a subsystem. For example, referring to FIG. 14, the NIC entry on line 229 is shown as indented to indicated there is some data structure to indicate that this NIC is coupled to the network corresponding to the data entry on line 227. Likewise, the data entry on line 231 indicates that the computer owning the NIC corresponding to the data entry on line 229 is running a Solaris 2.7 operating system. Likewise, the data entries on lines 233, 235 and 237 all are structured to indicate they are elements of the computer running the Solaris 2.7 operating system memorialized on line 231 and coupled to the network memorialized on line 227 by the NIC memorialized on line 229.

Step 254 represents the alternative embodiments of the process where all the steps 234 to 252 are repeated at a frequency defined by a refresh interval which is either fixed or configurable and wherein each entry for an element in the collected data table is time stamped so the changes in the attribute data for each element over time can be observed. Step 254 also represents the alternative embodiments where each fingerprint has its own configurable or fixed refresh schedule. Step 254 also represents the alternative embodiments wherein prior to using any fingerprint, configuration data is checked to make sure the fingerprint is "active" and only using the fingerprints that are marked as "active" to collect and analyze data.

In some embodiments, the discovery process of FIGS. 26A through 26C will be performed completely the first time to discover all or a designated subset of networks, NICs, operating systems and all the other elements then existing in the system. After that is done, the fingerprints marked as active by configuration data may used repeatedly according to refresh schedule data in a refresh table and collection calendar. Fingerprints may applied as the result of a user action. Collected attribute data is then analyzed with the fingerprint rules, and entries are made in the collected data table having timestamps so that how attribute data changes over time can be observed.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method for automatically discovering assets on a computing device associated with a computing network, the method comprising:

receiving user selection of one or more sources of asset fingerprints, wherein each source includes a collection of asset fingerprints used to identify one or more assets that may be found on a computing device, wherein each unique asset fingerprint includes a list of attributes associated with the unique asset;

executing instructions stored in memory, associated with an automatic asset discovery program, wherein a processor executes the instructions to:

discover existing networks, wherein discovery of existing networks is performed by matching network-based fingerprints with retrieved network information, wherein each existing network corresponds to a unique network-based fingerprint, gather information associated with one or more networks discovered from amongst the existing networks, wherein the gathered information includes:
identification of computing devices connected to the discovered networks, and
retrieving attribute information associated with each identified computing device, compare the asset fingerprints with the retrieved attribute information associated with each of the identified computing devices connected to the discovered networks, and identify the assets on each of the identified computing devices connected to the discovered networks based on matches between the retrieved attribute information from the computing devices and the asset fingerprints;

outputting a list of the assets found on the computing device to a database; and generating additional asset fingerprints for unknown assets associated with the computing device, wherein the additional asset fingerprints are generated via the automatic asset discovery program that collects attribute information from the computing device for those unknown assets that did not match with any of the compared asset fingerprints, the generated additional asset fingerprints being stored in the collection of asset fingerprints for subsequent use to identify the unknown assets in other computing devices.

2. The method of claim 1, wherein the one or more assets includes hardware and software assets stored on the computing device.

3. The method of claim 1, wherein the one or more assets includes individual files that are stored on the computing device.

4. The method of claim 1, wherein the one or more sources of the collection of asset fingerprints includes backup tapes or backup disk drive images.

5. The method of claim 4, wherein the backup tapes or backup disk drive images include a time-based element specifying one or more points in time, and wherein the time-based element is usable by the automatic asset discovery program to identify an existence of one or more assets on the computing device at the specified one or more points in time.

6. The method of claim 1, wherein the user selection is provided by the user via a user interface (UI) associated with the computing device.

7. The method of claim 1, wherein the collection of asset fingerprints from one or more sources are grouped based on a plurality of different categories, and wherein only fingerprints from the collection of fingerprints belonging to a category associated with the computing device are used for comparison.

8. The method of claim 7, wherein the plurality of different categories includes an operating system associated with the computing device.

9. The method of claim 1, wherein the gathered information includes identifying network cards associated with each of the computing devices connected to the discovered networks.

10. The method of claim 1, wherein the gathered information associated with the discovered network includes a valid address corresponding to a location of the discovered networks.

11. The method of claim 1, wherein gathering information associated with the discovered network further includes identifying active computing devices connected to the discovered networks.

12. A computer readable non-transitory storage medium having embodied thereon a program, the program being executable by a processor to perform a method for automatically discovering assets on a computing device associated with a computing network, the method comprising:

receiving user selection of one or more sources of asset fingerprints, wherein each source includes a collection of asset fingerprints used to identify one or more assets that may be found on a computing device, wherein each unique asset fingerprint includes a list of attributes associated with the unique asset;

discovering existing networks, wherein discovery of existing networks is performed by matching network-based fingerprints with retrieved network information, wherein each existing network corresponds to a unique network-based fingerprint, gathering information associated with one or more networks discovered from amongst the existing networks, wherein the gathered information includes:
identification of computing devices connected to the discovered networks, and
retrieving attribute information associated with each identified computing device;

comparing the asset fingerprints with the retrieved attribute information associated with each of the identified computing devices connected to the discovered networks;

identifying the assets on each of the identified computing devices connected to the discovered networks based on matches between the retrieved attribute I information from the computing devices and the asset fingerprints;

outputting a list of the assets found on the computing device to a database; and generating additional asset fingerprints for unknown assets associated with the computing device, wherein the additional asset fingerprints are generated via the automatic asset discovery program that collects attribute information from the computing device for those unknown assets that did not match with any of the compared asset fingerprints, the generated additional asset fingerprints stored in the collection of asset fingerprints for subsequent use to identify the unknown assets in other computing devices.

* * * * *

UNITED STATES PATENT AND TRADEMARK OFFICE
CERTIFICATE OF CORRECTION

PATENT NO. : 10,380,538 B2
APPLICATION NO. : 11/236139
DATED : August 13, 2019
INVENTOR(S) : Alistair D'Lougar Black It is certified that error appears in the above-identified patent and that said Letters Patent is hereby corrected as shown below:

In the Specification

At Column 1, Line 59, delete "twofold," and insert --twofold:--.

At Column 7, Line 39, delete "thereof" and insert --thereof)--.

At Column 7, Line 40, delete "thereof" and insert --thereof)--.

At Column 21, Line 59, delete "a'search" and insert --a search--.

At Column 26, Line 31, delete "words;" and insert --words,--.

At Column 27, Line 27, delete "APIS," and insert --APIs,--.

Signed and Sealed this
Twenty-sixth Day of November, 2019

Andrei Iancu
*Director of the United States Patent and Trademark Office*